United States Patent
Li et al.

(10) Patent No.: US 12,512,918 B2
(45) Date of Patent: Dec. 30, 2025

(54) COMMUNICATION METHOD AND APPARATUS

(71) Applicant: HUAWEI TECHNOLOGIES CO., LTD., Guangdong (CN)

(72) Inventors: Hong Li, Beijing (CN); Li Zhang, Beijing (CN); Jing Han, Beijing (CN); Zhongyi Shen, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 355 days.

(21) Appl. No.: 17/936,855

(22) Filed: Sep. 30, 2022

(65) Prior Publication Data

US 2023/0026501 A1  Jan. 26, 2023

Related U.S. Application Data

(63) Continuation of application No. PCT/CN2021/085671, filed on Apr. 6, 2021.

(30) Foreign Application Priority Data

Apr. 10, 2020  (CN) .......................... 202010281694.6

(51) Int. Cl.
*H04B 17/336* (2015.01)

(52) U.S. Cl.
CPC .................................. *H04B 17/336* (2015.01)

(58) Field of Classification Search
CPC .. H04B 17/336; H04B 17/328; H04B 17/345; H04B 17/309
See application file for complete search history.

(56) References Cited

U.S. PATENT DOCUMENTS

| 10,945,149 B1 * | 3/2021 | Ryu ..................... H04L 5/0007 |
| 2020/0395989 A1 * | 12/2020 | Faxér .................... H04L 5/0057 |

(Continued)

FOREIGN PATENT DOCUMENTS

| CN | 110535545 A | 12/2019 |
| CN | 110945799 A | 3/2020 |

(Continued)

OTHER PUBLICATIONS

Mediatek Inc., "CR for CSI-RS based L1-RSRP measurement period (section 9.5.4.2)", 3GPP TSG-RAN WG4 Meeting #94-e R4-2000920, Feb. 14, 2020, total 4 pages.

(Continued)

*Primary Examiner* — Deepa Belur

(57) ABSTRACT

This application relates to the field of communication technologies, and provides a communication method and apparatus, to determine a measurement periodicity in which a communication device performs layer 1 signal to interference plus noise ratio (L1-SINR) beam measurement based on a channel measurement resource (CMR) and an interference measurement resource (IMR). The method includes: A communication device receives a CMR and an IMR corresponding to the CMR. A terminal measures an L1-SINR of a receive beam based on the CMR and the IMR, to determine an optimal receive beam of the terminal. The CMR and the IMR are channel state information reference signal (CSI-RS) resources in different CSI-RS resource sets. The communication device determines a value of a first parameter based on repetition corresponding to a CSI-RS resource set corresponding to the CMR, and determines, based on the value of the first parameter, a measurement periodicity for measuring the L1-SINR.

22 Claims, 14 Drawing Sheets

(56) References Cited

U.S. PATENT DOCUMENTS

| | | | |
|---|---|---|---|
| 2021/0410160 A1* | 12/2021 | Guo | H04W 72/21 |
| 2022/0015060 A1* | 1/2022 | Wang | H04W 52/367 |
| 2022/0174712 A1* | 6/2022 | Zhang | H04W 72/20 |
| 2022/0321189 A1* | 10/2022 | Wei | H04B 7/0632 |
| 2023/0026501 A1* | 1/2023 | Li | H04B 7/0695 |
| 2024/0372679 A1* | 11/2024 | Zhu | H04L 5/0053 |

FOREIGN PATENT DOCUMENTS

| | | |
|---|---|---|
| CN | 111586724 A | 8/2020 |
| CN | 111818563 A | 10/2020 |
| WO | 2017196946 A1 | 11/2017 |
| WO | WO-2020204323 A1 * | 10/2020 |

OTHER PUBLICATIONS

3GPP TS 38.133 V16.3.0:"3rd Generation Partnership Project; Technical Specification Group Radio Access Network; NR;Requirements for support of radio resource management(Release 16)",Mar. 2020,total 1170 pages.

Huawei et al: "Further discussion on L1-SINR measurement requirement for NR eMIMO", 3GPP Draft; R4-1914834,Nov. 8, 2019, XP051819152, total 3 pages.

Samsung: "CR to TS38.133 on L 1-SINR Measurement Requirement (Section 3.3 and 9)", 3GPP Draft; R4-2000288,Feb. 14, 2020, XP051850337, total 14 pages.

Huawei et al: "Enhancements on multi-beam operation", 3GPP Draft; R1-1908067, Aug. 17, 2019, XP051764690, total 20 pages.

* cited by examiner

COMMUNICATION METHOD AND APPARATUS

CROSS-REFERENCE TO RELATED APPLICATIONS

This application is a continuation of International Application No. PCT/CN2021/085671, filed on Apr. 6, 2021, which claims priority to Chinese Patent Application No. 202010281694.6, filed on Apr. 10, 2020. The disclosures of the aforementioned applications are hereby incorporated by reference in their entireties.

TECHNICAL FIELD

This application relates to the field of communication technologies, and in particular, to a communication method and apparatus.

BACKGROUND

In a current 5th generation (5th generation, 5G) network, a network device configures a channel measurement resource (channel measurement resource, CMR) and an interference measurement resource (interference measurement resource, IMR) for a terminal, so that the terminal performs layer 1 signal to interference plus noise ratio (layer 1 signal to interference plus noise ratio, L1-SINR) measurement based on the CMR and the IMR, to determine an optimal receive beam. When performing L1-SINR beam measurement based on the CMR and the IMR, the terminal needs to determine a measurement periodicity, and complete L1-SINR beam measurement of a beam within the measurement periodicity. However, in a current technology, the terminal cannot determine the measurement periodicity for performing L1-SINR beam measurement based on the CMR and the IMR.

SUMMARY

This application provides a communication method and apparatus, to determine a measurement periodicity in which a communication device performs L1-SINR beam measurement based on a CMR and an IMR.

To achieve the foregoing objective, this application uses the following technical solutions.

According to a first aspect, a communication method is provided. The communication method includes: A communication device receives a CMR and an IMR corresponding to the CMR that are indicated by a network device, where the CMR and the IMR are used to measure an L1-SINR, the CMR includes one or more channel state information reference signal (CSI-RS) resources in a first CSI-RS resource set, and the IMR includes one or more CSI-RS resources in a second CSI-RS resource set. The communication device determines a value of a first parameter based on a repetition parameter repetition corresponding to the first CSI-RS resource set. The communication device determines, based on the value of the first parameter, a measurement periodicity for measuring the L1-SINR.

Based on the foregoing technical solution, in this application, a terminal determines the value of the first parameter based on repetition of the first CSI-RS resource set. Therefore, a specific value of the first parameter in a scenario in which L1-SINR beam measurement is performed based on the CMR and the IMR is specified. In this way, the terminal may determine, based on the value of the first parameter, the measurement periodicity for measuring the L1-SINR.

With reference to the first aspect, in a possible implementation of the first aspect, if the repetition parameter repetition of the first CSI-RS resource set is configured as "on", the value of the first parameter is $\lceil R/K \rceil$, or the value of the first parameter is $\lceil R/\min(K, L) \rceil$. A value of R is a maximum quantity of receive beams that is reported when the communication device performs capability reporting, min(K, L) indicates that a smaller value in K and L is used, a value of K is a quantity of CSI-RS resources in the first CSI-RS resource set, and a value of L is a quantity of CSI-RS resources in the second CSI-RS resource set.

Based on this, when repetition of the first CSI-RS resource set is configured as "on", the terminal can determine the value of the first parameter based on the quantity of receive beams, the quantity of CSI-RS resources in the first CSI-RS resource set, and the quantity of CSI-RS resources in the second CSI-RS resource set.

With reference to the first aspect, in a possible implementation of the first aspect, if the repetition parameter repetition of the first CSI-RS resource set is configured as "off", the value of the first parameter is 1.

Based on this, when repetition of the first CSI-RS resource set is configured as "off", the terminal can directly determine the value of the first parameter.

With reference to the first aspect, in a possible implementation of the first aspect, the communication method further includes: The communication device determines the value of the first parameter based on the repetition parameter repetition corresponding to the first CSI-RS resource set and a repetition parameter repetition corresponding to the second CSI-RS resource set.

Based on this, the terminal may determine the value of the first parameter based on repetition of the first CSI-RS resource set and repetition of the second CSI-RS resource set. In this way, this application can be applied to different scenarios.

With reference to the first aspect, in a possible implementation of the first aspect, if the repetition parameter repetition of the first CSI-RS resource set and the repetition parameter repetition of the second CSI-RS resource set are both configured as "on", the value of N is $\lceil R/K \rceil$, or the value of N is $\lceil R/\min(K, L) \rceil$. A value of R is a maximum quantity of receive beams that is reported when the communication device performs capability reporting, min(K, L) indicates that a smaller value in K and L is used, a value of K is a quantity of CSI-RS resources in the first CSI-RS resource set, and a value of L is a quantity of CSI-RS resources in the second CSI-RS resource set.

Based on this, when repetition of the first CSI-RS resource set and repetition of the second CSI-RS resource set are both configured as "on", the terminal can determine the value of the first parameter based on the quantity of receive beams, the quantity of CSI-RS resources in the first CSI-RS resource set, and the quantity of CSI-RS resources in the second CSI-RS resource set.

With reference to the first aspect, in a possible implementation of the first aspect, if the repetition parameter repetition of the first CSI-RS resource set is configured as "off", or the repetition parameter repetition of the second CSI-RS resource set is configured as "off", the value of N is 8, or the value of N is R, where a value of R is a maximum quantity of receive beams that is reported when the communication device performs capability reporting.

Based on this, when repetition of the first CSI-RS resource set or repetition of the second CSI-RS resource set is configured as "off", the terminal can directly determine the value of the first parameter.

With reference to the first aspect, in a possible implementation of the first aspect, a configuration of a repetition parameter repetition of the IMR is consistent with a configuration of a repetition parameter repetition of the CMR. This helps the terminal perform beam measurement based on the CMR and the IMR.

With reference to the first aspect, in a possible implementation of the first aspect, the communication device determines a value of the measurement periodicity $T_{L1\text{-}SINR}$ of L1-SINK beam measurement according to the following formula:

$$T_{L1\text{-}SINR} = [M \times P \times N] \times T_{CMR\_CSI\text{-}RS}$$

M is a quantity of samples corresponding to the measurement periodicity of the L1-SINR beam measurement, P is a measurement relaxation factor, N is the first parameter, and $T_{CMR\_CSI\text{-}RS}$ is a periodicity corresponding to the CMR. Based on this, the terminal may accurately determine the measurement periodicity of the L1-SINR beam measurement based on the formula, and the first parameter and another parameter in the formula.

With reference to the first aspect, in a possible implementation of the first aspect, if the repetition parameter repetition of the first CSI-RS resource set is configured as "off", each CSI-RS resource in the first CSI-RS resource set has a corresponding measurement resource, and the CSI-RS resource and the corresponding measurement resource have a quasi co-location type D (QCL-TypeD) relationship. Based on this, the terminal can determine, based on the QCL-TypeD of the CSI-RS resource, an optimal receive beam corresponding to the CSI-RS resource.

With reference to the first aspect, in a possible implementation of the first aspect, the measurement resource is a synchronization signal block (SSB), and the SSB is a CMR that can be used to measure the L1-SINR, or the SSB is a CMR that can be used to measure an L1-RSRP. During the L1-SINR beam measurement or L1-RSRP measurement, the terminal can periodically determine an optimal receive beam corresponding to the SSB. Therefore, when the measurement resource is the SSB, the terminal can determine, based on the optimal receive beam corresponding to the SSB, an optimal receive beam corresponding to a CSI-RS.

With reference to the first aspect, in a possible implementation of the first aspect, the measurement resource is a CSI-RS resource in a third CSI-RS resource set, a repetition parameter repetition of the third CSI-RS resource set is configured as "on", and the first CSI-RS resource set, the second CSI-RS resource set, and the third CSI-RS resource set are different from each other.

With reference to the first aspect, in a possible implementation of the first aspect, the CSI-RS resource in the third CSI-RS resource set is a CMR that can be used to measure the L1-SINR, or the CSI-RS resource in the third CSI-RS resource set is a CMR that can be used to measure an L1-RSRP. During the L1-SINR beam measurement or L1-RSRP measurement, the terminal can periodically determine an optimal receive beam corresponding to an SSB. Therefore, when the measurement resource is the SSB, the terminal can determine, based on the optimal receive beam corresponding to the SSB, an optimal receive beam corresponding to a CSI-RS.

With reference to the first aspect, in a possible implementation of the first aspect, an L1-SINR beam measurement result is used for beam management.

With reference to the first aspect, in a possible implementation of the first aspect, the first CSI-RS resource set, the second CSI-RS resource set, and the third CSI-RS resource set are different CSI-RS resource sets.

According to a second aspect, a communication method is provided. The communication method includes: A network device generates a channel measurement resource CMR and an interference measurement resource IMR corresponding to the CMR, where the CMR and the IMR are used to measure a layer 1 signal to interference plus noise ratio L1-SINR, the CMR includes one or more CSI-RS resources in a first CSI-RS resource set, and the IMR includes one or more CSI-RS resources in a second CSI-RS resource set. The network device sends the CMR and the IMR corresponding to the CMR to a terminal.

Based on the foregoing technical solution, the network device configures the CMR and the IMR corresponding to the CMR for the terminal, so that the terminal can perform L1-SINR beam measurement based on the CMR and the IMR corresponding to the CMR, to perform beam management.

With reference to the second aspect, in a possible implementation of the second aspect, a configuration of a repetition parameter repetition of the IMR is consistent with a configuration of a repetition parameter repetition of the CMR.

With reference to the second aspect, in a possible implementation of the second aspect, if a repetition parameter repetition of the first CSI-RS resource set is configured as "off", the network device configures a corresponding measurement resource for each CSI-RS resource in the first CSI-RS resource set, where the CSI-RS resource and the corresponding measurement resource have a quasi co-location QCL-type TypeD relationship.

With reference to the second aspect, in a possible implementation of the second aspect, the measurement resource is an SSB, and the SSB is a CMR that can be used to measure the L1-SINR, or the SSB is a CMR that can be used to measure an L1-RSRP.

With reference to the second aspect, in a possible implementation of the second aspect, the measurement resource is a CSI-RS resource in a third CSI-RS resource set, a repetition parameter repetition of the third CSI-RS resource set is configured as "on", and the CSI-RS resource in the third CSI-RS resource set is a CMR that can be used to measure the L1-SINR, or the CSI-RS resource in the third CSI-RS resource set is a CMR that can be used to measure an L1-RSRP.

With reference to the second aspect, in a possible implementation of the second aspect, an L1-SINR beam measurement result is used for beam management.

With reference to the second aspect, in a possible implementation of the second aspect, the first CSI-RS resource set, the second CSI-RS resource set, and the third CSI-RS resource set are different CSI-RS resource sets.

According to a third aspect, a communication apparatus is provided. The apparatus includes a transceiver module and a processing module. The transceiver module is configured to receive a channel measurement resource CMR and an interference measurement resource IMR corresponding to the CMR that are indicated by a network device, where the CMR and the IMR are used to measure a layer 1 signal to interference plus noise ratio L1-SINR, the CMR includes one or more CSI-RS resources in a first CSI-RS resource set, and the IMR includes one or more CSI-RS resources in a second CSI-RS resource set.

The processing module is configured to determine a value of a first parameter based on a repetition parameter repetition corresponding to the first CSI-RS resource set.

The processing module is further configured to determine, based on the value of the first parameter, a measurement periodicity for measuring the L1-SINR.

With reference to the third aspect, in a possible implementation of the third aspect, if the repetition parameter repetition of the first CSI-RS resource set is configured as "on", the value of the first parameter is $\lceil R/K \rceil$, or the value of the first parameter is $\lceil R/\min(K, L) \rceil$. A value of R is a maximum quantity of receive beams that is reported when the communication apparatus performs capability reporting, min(K, L) indicates that a smaller value in K and L is used, a value of K is a quantity of CSI-RS resources in the first CSI-RS resource set, and a value of L is a quantity of CSI-RS resources in the second CSI-RS resource set.

With reference to the third aspect, in a possible implementation of the third aspect, if the repetition parameter repetition of the first CSI-RS resource set is configured as "off", the value of the first parameter is 1.

With reference to the third aspect, in a possible implementation of the third aspect, the processing module is further configured to determine the value of the first parameter based on the repetition parameter repetition corresponding to the first CSI-RS resource set and a repetition parameter repetition corresponding to the second CSI-RS resource set.

With reference to the third aspect, in a possible implementation of the third aspect, if the repetition parameter repetition of the first CSI-RS resource set and the repetition parameter repetition of the second CSI-RS resource set are both configured as "on", the value of N is $\lceil R/K \rceil$, or the value of N is $\lceil R/\min(K, L) \rceil$. A value of R is a maximum quantity of receive beams that is reported when the communication apparatus performs capability reporting, min(K, L) indicates that a smaller value in K and L is used, a value of K is a quantity of CSI-RS resources in the first CSI-RS resource set, and a value of L is a quantity of CSI-RS resources in the second CSI-RS resource set.

With reference to the third aspect, in a possible implementation of the third aspect, if the repetition parameter repetition of the first CSI-RS resource set is configured as "off", or the repetition parameter repetition of the second CSI-RS resource set is configured as "off", the value of N is 8, or the value of N is R, where a value of R is a maximum quantity of receive beams that is reported when the communication apparatus performs capability reporting.

With reference to the third aspect, in a possible implementation of the third aspect, a configuration of a repetition parameter repetition of the IMR is consistent with a configuration of a repetition parameter repetition of the CMR.

With reference to the third aspect, in a possible implementation of the third aspect, if the repetition parameter repetition of the first CSI-RS resource set is configured as "off", each CSI-RS resource in the first CSI-RS resource set has a corresponding measurement resource, and the CSI-RS resource and the corresponding measurement resource have a quasi co-location QCL-type TypeD relationship.

With reference to the third aspect, in a possible implementation of the third aspect, the measurement resource is an SSB, and the SSB is a CMR that can be used to measure the L1-SINR, or the SSB is a CMR that can be used to measure an L1-RSRP.

With reference to the third aspect, in a possible implementation of the third aspect, the measurement resource is a CSI-RS resource in a third CSI-RS resource set, a repetition parameter repetition of the third CSI-RS resource set is configured as "on", and the CSI-RS resource in the third CSI-RS resource set is a CMR that can be used to measure the L1-SINR, or the CSI-RS resource in the third CSI-RS resource set is a CMR that can be used to measure an L1-RSRP.

With reference to the third aspect, in a possible implementation of the third aspect, an L1-SINR beam measurement result is used for beam management.

With reference to the third aspect, in a possible implementation of the third aspect, the first CSI-RS resource set, the second CSI-RS resource set, and the third CSI-RS resource set are different CSI-RS resource sets.

According to a fourth aspect, a network device is provided. The network device includes a transceiver module and a processing module. The processing module is configured to generate a channel measurement resource CMR and an interference measurement resource IMR corresponding to the CMR, where the CMR and the IMR are used to measure a layer 1 signal to interference plus noise ratio L1-SINR, the CMR includes one or more CSI-RS resources in a first CSI-RS resource set, and the IMR includes one or more CSI-RS resources in a second CSI-RS resource set.

The transceiver module is configured to send the CMR and the IMR corresponding to the CMR to a terminal.

With reference to the fourth aspect, in a possible implementation of the fourth aspect, a configuration of a repetition parameter repetition of the IMR is consistent with a configuration of a repetition parameter repetition of the CMR.

With reference to the fourth aspect, in a possible implementation of the fourth aspect, if a repetition parameter repetition of the first CSI-RS resource set is configured as "off", the processing module is further configured to configure a corresponding measurement resource for each CSI-RS resource in the first CSI-RS resource set, where the CSI-RS resource and the corresponding measurement resource have a quasi co-location QCL-type TypeD relationship.

With reference to the fourth aspect, in a possible implementation of the fourth aspect, the measurement resource is an SSB, and the SSB is a CMR that can be used to measure the L1-SINR, or the SSB is a CMR that can be used to measure an L1-RSRP.

With reference to the fourth aspect, in a possible implementation of the fourth aspect, the measurement resource is a CSI-RS resource in a third CSI-RS resource set, a repetition parameter repetition of the third CSI-RS resource set is configured as "on", and the CSI-RS resource in the third CSI-RS resource set is a CMR that can be used to measure the L1-SINR, or the CSI-RS resource in the third CSI-RS resource set is a CMR that can be used to measure an L1-RSRP.

With reference to the fourth aspect, in a possible implementation of the fourth aspect, an L1-SINR beam measurement result is used for beam management.

With reference to the fourth aspect, in a possible implementation of the fourth aspect, the first CSI-RS resource set, the second CSI-RS resource set, and the third CSI-RS resource set are different CSI-RS resource sets.

According to a fifth aspect, a communication device is provided. The communication device includes a memory and a processor. The memory is configured to store instructions. The processor is configured to execute the instructions stored in the memory, and the execution of the instructions stored in the memory enables the processor to perform the method according to any one of the first aspect or the possible implementations of the first aspect.

According to a sixth aspect, a communication device is provided. The network device includes a memory and a processor. The memory is configured to store instructions. The processor is configured to execute the instructions stored in the memory, and the execution of the instructions stored in the memory enables the processor to perform the method according to any one of the second aspect or the possible implementations of the second aspect.

According to a seventh aspect, a computer-readable storage medium is provided. The computer-readable storage medium stores a computer program. When the program is executed by a processor, the method according to any one of the first aspect or the possible implementations of the first aspect is implemented.

According to an eighth aspect, a computer-readable storage medium is provided. The computer-readable storage medium stores a computer program. When the program is executed by a processor, the method according to any one of the second aspect or the possible implementations of the second aspect is implemented.

According to a ninth aspect, this application provides a computer program product including instructions. When the computer program product runs on a computer, the computer is enabled to perform the method according to any one of the first aspect and the possible implementations of the first aspect.

According to a tenth aspect, this application provides a computer program product including instructions. When the computer program product runs on a computer, the computer is enabled to perform the method according to any one of the second aspect and the possible implementations of the second aspect.

According to an eleventh aspect, this application provides a system chip. The system chip may be used in a communication device. The system chip includes at least one processor, and related program instructions are executed in the at least one processor to implement the method according to any one of the first aspect and the possible implementations of the first aspect. Optionally, the system chip may further include at least one memory. The memory stores the related program instructions.

According to a twelfth aspect, this application provides a system chip. The system chip may be used in a first network device. The system chip includes at least one processor, and related program instructions are executed in the at least one processor to implement the method according to any one of the second aspect and the possible implementations of the second aspect. Optionally, the system chip may further include at least one memory. The memory stores the related program instructions.

According to a thirteenth aspect, this application provides a communication system, including a communication device and a network device that communicates with the communication device. The communication device is configured to perform the method according to any one of the first aspect and the possible implementations of the first aspect, or the communication device is configured to perform the method according to any one of the second aspect and the possible implementations of the second aspect. The network device is configured to send a CMR and an IMR corresponding to the CMR to a terminal.

It should be understood that, descriptions of technical features, technical solutions, beneficial effects, or similar words in this application do not imply that all features and advantages can be implemented in any individual embodiment. On the contrary, it may be understood that, the descriptions of the features or the beneficial effects mean that at least one embodiment includes a specific technical feature, technical solution, or beneficial effect. Therefore, the descriptions of the technical features, the technical solutions, or the beneficial effects in this specification may not necessarily belong to one embodiment. Further, the technical features, the technical solutions, and the beneficial effects described in embodiments may be combined in any proper manner. A person skilled in the art may understand that an embodiment may be implemented without one or more specific technical features, technical solutions, or beneficial effects in a specific embodiment. In other embodiments, additional technical features and beneficial effects may be further identified in a specific embodiment that does not reflect all embodiments.

DETAILED DESCRIPTION OF EMBODIMENTS

The following describes technical solutions in embodiments of this application with reference to the accompanying drawings in embodiments of this application. In descriptions of this application, unless otherwise specified, "I" means "or". For example, A/B may represent A or B. "And/or" in this specification describes only an association relationship between associated objects and represents that three relationships may exist. For example, A and/or B may represent the following three cases: Only A exists, both A and B exist, and only B exists. In addition, in the descriptions of this application, unless otherwise specified, "a plurality of" means two or more, and "at least one" means one or more.

In addition, to clearly describe the technical solutions in embodiments of this application, terms such as "first" and "second" are used in embodiments of this application to distinguish between same items or similar items that have basically the same functions and purposes. A person skilled in the art may understand that the terms such as "first" and "second" do not limit a quantity or an execution sequence, and the terms such as "first" and "second" do not indicate a definite difference.

Figure 1:
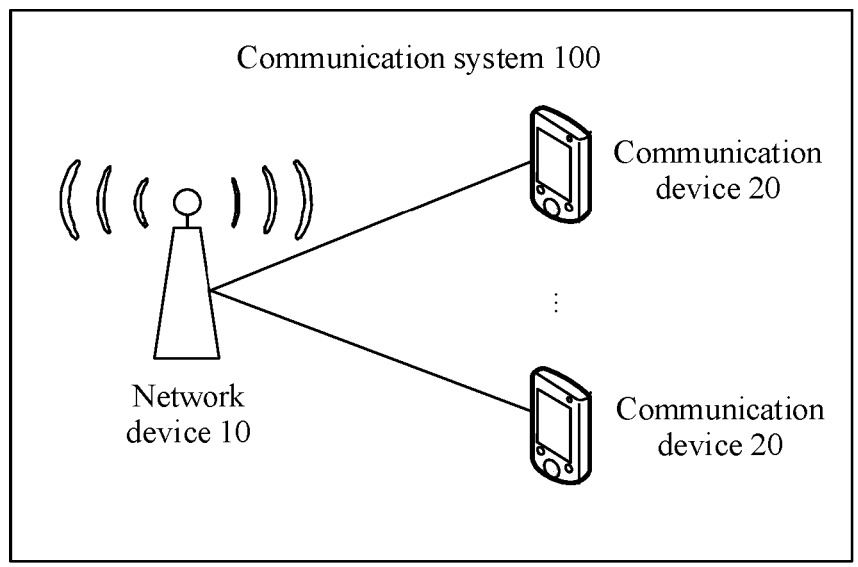
FIG. 1 is a diagram of a system architecture of a communication system according to an embodiment of this application.

This application may be applied to a communication system 100 shown in FIG. 1. As shown in FIG. 1, the communication system 100 includes a network device 10 and a communication device 20.

The network device 10 in this embodiment of this application is configured to configure a CMR and/or an IMR for the communication device 20. The communication device 20 is configured to: perform L1-SINR beam measurement based on the CMR and the IMR that are indicated by the network device 10, and report one or more L1-SINRs to a terminal.

In this embodiment of this application, that the communication device 20 is the terminal is used as an example for description.

A communication system in embodiments of this application includes but is not limited to a long term evolution (Long Term Evolution, LTE) system, a public land mobile network (Public Land Mobile Network, PLMN) system, a 5th generation (5th generation, 5G) system, a new radio (new radio, NR) system, a wireless local area network (wireless local area network, WLAN) system, a future evolved system, or a plurality of converged communication systems. For example, a method provided in embodiments of this application may be specifically applied to an evolved universal terrestrial radio access network (evolved universal terrestrial radio access network, E-UTRAN) system and a next generation-radio access network (next generation-radio access network, NG-RAN) system.

A network device in embodiments of this application is a network-side entity configured to send a signal, receive a signal, or send a signal and receive a signal. The network device may be an apparatus that is deployed in a radio access network (radio access network, RAN) to provide a wireless communication function for a terminal, for example, a transmission reception point (transmission reception point, TRP), a base station (for example, an evolved NodeB (evolved NodeB, eNB or eNodeB), a next generation node base station (next generation node base station, gNB), or a next generation eNB (next generation eNB, ng-eNB)), control nodes in various forms (for example, a network controller and a radio controller (for example, a radio controller in a cloud radio access network (cloud radio access network, CRAN) scenario)), a road side unit (road side unit, RSU), or the like. Specifically, the network device may be a macro base station, a micro base station (also referred to as a small cell), a relay station, an access point (access point, AP), or the like in various forms, or may be an antenna panel of a base station. The control node may be connected to a plurality of base stations, and configure resources for a plurality of terminals within coverage of the plurality of base stations. In systems using different radio access technologies (radio access technologies, RATs), names of devices having a base station function may be different. For example, the base station may be referred to as an eNB or an eNodeB in an LTE system, and may be referred to as a gNB in a 5G system or an NR system. A specific name of the base station is not limited in this application. The network device may alternatively be a network device in a future evolved public land mobile network (public land mobile network, PLMN) or the like.

A terminal in embodiments of this application is a user-side entity configured to receive a signal, send a signal, or receive a signal and send a signal. The terminal is configured to provide a user with one or more of a voice service and a data connectivity service. The terminal may also be referred to as user equipment (user equipment, UE), an access terminal, a subscriber unit, a subscriber station, a mobile station, a remote station, a remote terminal, a mobile device, a user terminal, a wireless communication device, a user agent, or a user apparatus. The terminal may be a vehicle-to-everything (vehicle-to-everything, V2X) device, for example, a smart car (smart car or intelligent car), a digital car (digital car), an unmanned car (unmanned car, driverless car, pilotless car, or automobile), a self-driving car (self-driving car or autonomous car), a pure electric vehicle (pure EV or Battery EV), a hybrid electric vehicle (hybrid electric vehicle, HEV), a range extended electric vehicle (range extended EV, REEV), a plug-in hybrid electric vehicle (plug-in REV, PHEV), or a new energy vehicle (new energy vehicle). Alternatively, the terminal may be a device-to-device (device-to-device, D2D) device, for example, an electricity meter or a water meter. Alternatively, the terminal may be a mobile station (mobile station, MS), a subscriber unit (subscriber unit), an unmanned aerial vehicle, an internet of things (internet of things, IoT) device, a station (station, ST) in a WLAN, a cellular phone (cellular phone), a smartphone (smartphone), a cordless phone, a wireless data card, a tablet computer, a session initiation protocol (session initiation protocol, SIP) phone, a wireless local loop (wireless local loop, WLL) station, a personal digital assistant (personal digital assistant, PDA) device, a laptop computer (laptop computer), a machine type communication (machine type communication, MTC) terminal, a handheld device having a wireless communication function, a computing device or another processing device connected to a wireless modem, a vehicle-mounted device, or a wearable device (which may also be referred to as a wearable intelligent device). Alternatively, the terminal may be a terminal in a next generation communication system, for example, a terminal in a 5G system, a terminal in a future evolved PLMN, or a terminal in an NR system.

To make the method provided in embodiments of this application clearer, the following briefly describes some concepts or content related to embodiments of this application.

1. Beam (Beam)

The beam is a communication resource. The beam may be a wide beam, a narrow beam, or a beam of another type. A technology for forming the beam may be a beamforming technology or another technical means. The beamforming technology may be specifically a digital beamforming technology, an analog beamforming technology, or a hybrid digital/analog beamforming technology. Different beams may be considered as different resources. Same information or different information may be sent by using different beams. Optionally, a plurality of beams having a same communication feature or similar communication features may be considered as one beam. One beam may include one or more antenna ports for transmitting a data channel, a control channel, a sounding signal, and the like. For example, a transmit beam may refer to distribution of signal strength formed in different directions in space after a signal is sent through an antenna, and a receive beam may refer to distribution of signal strength, in different directions in space, of a radio signal received from an antenna. It may be understood that, one or more antenna ports forming one beam may also be considered as one antenna port set.

Beams may be classified into a transmit beam and a receive beam of a network device and a transmit beam and a receive beam of a terminal. The transmit beam of the network device is used to describe transmit-side beamforming information of the network device, and the receive beam of the network device is used to describe receive-side beamforming information of the network device. The transmit beam of the terminal is used to describe transmit-side beamforming information of the terminal, and the receive beam of the terminal is used to describe receive-side beamforming information of the terminal. In other words, the beam is used to describe beamforming information.

In a current NR protocol, beam information may be indicated by using a quasi co-location (quasi co-location, QCL for short) relationship between antenna ports. Specifically, indication information (for example, downlink control information (downlink control information, DCI for short)) may indicate that one resource (or antenna port) and another resource (or antenna port) have a QCL relationship, to indicate that beams corresponding to the two resources (or antenna ports) have a same spatial feature, and a same receive beam may be used for receiving. In the protocol, a beam may be specifically represented by using identifiers of various signals, for example, a resource index of a channel state information reference signal (channel state information reference signal, CSI-RS for short), an index of a synchronization signal and physical broadcast channel block (synchronization signal/physical broadcast channel block, which may be referred to as an SS/PBCH block for short, or may be referred to as an SSB for short), a resource index of a sounding reference signal (sounding reference signal, SRS for short), or a resource index of a tracking reference signal (tracking reference signal, TRS for short).

The beam may correspond to one or more of a time resource, a space resource, and a frequency domain resource.

The beam may further correspond to a reference signal resource (for example, a reference signal resource for beamforming) or beamforming information.

The beam may further correspond to information associated with a reference signal resource of the network device. A reference signal may be a CSI-RS, an SSB, a demodulation reference signal (demodulation reference signal, DMRS), a phase tracking reference signal (phase tracking reference signal, PTRS), a TRS, or the like. The information associated with the reference signal resource may be an identifier of the reference signal resource, QCL information (especially information of QCL-TypeD), or the like. The identifier of the reference signal resource corresponds to a transmit-receive beam pair that is previously established during measurement performed based on the reference signal resource. The terminal may infer beam information by using the index of the reference signal resource.

2. QCL

The QCL indicates that one reference signal and another reference signal have some same features. A QCL parameter includes at least one of a Doppler spread, a Doppler frequency shift, an average delay, a delay spread, and a spatial domain reception parameter. When there is a QCL relationship between two signals, at least one of a same delay spread, a same Doppler spread, a same average gain, a same average delay, and a same spatial domain parameter may be selected to send or receive the signals, and a same beam may be selected to send or receive the signals.

Currently, the TS 38.214 protocol defines four QCL types. The following describes in detail parameters included in each QCL type. The parameters included in the QCL type are same parameters of reference signals having the QCL relationship.

"QCL-TypeA": {Doppler frequency shift, Doppler spread, average delay, delay spread}.

"QCL-TypeB": {Doppler frequency shift, Doppler spread}.

"QCL-TypeC": {Doppler frequency shift, average delay}.

"QCL-TypeD": {spatial domain reception parameter}.

"QCL-TypeD" may be used to describe a case in which beams of two reference signals having a "QCL-TypeD" relationship are similar, some channel parameters of the two reference signals are similar or the same, and optimal receive beams of the two reference signals are the same. A terminal may receive a reference signal 1 and a reference signal 2 by using the optimal receive beam. For example, when there is a "QCL-TypeD" QCL relationship between a reference signal 1 and a reference signal 2, the terminal determines that optimal receive beams of the reference signal 1 and the reference signal 2 are the same. After determining an optimal receive beam of the reference signal 1, the terminal determines that the optimal receive beam is also an optimal receive beam of the reference signal 2.

3. CSI-RS

The CSI-RS is used to evaluate beam quality. A beam may correspond to a CSI-RS resource. Therefore, a terminal may determine quality of the CSI-RS resource by measuring and evaluating the CSI-RS resource. The terminal reports, to a network device, the quality of the CSI-RS resource that is obtained through measurement and evaluation, so that the network device can determine quality of the beam based on the quality of the CSI-RS resource and a correspondence between the beam and the CSI-RS resource.

4. Discontinuous Reception (Discontinuous Reception, DRX) Mode

The DRX mode is a mode for a terminal to receive a signal, and is used to reduce power consumption of the terminal. The terminal may determine, based on a configuration of a network, whether to receive the signal in the DRX mode. When the terminal receives the signal in the DRX mode, in a DRX periodicity, the terminal may receive data within active time (active time), and enter sleep time outside the active time. During the sleep time, the terminal does not receive data. The DRX periodicity is an interval between start time points of two adjacent periods of active time, and may also be referred to as a length of a DRX cycle.

5. L1-RSRP Beam Measurement

In Rel-15 NR, a terminal supports beam measurement performed based on an L1-RSRP. The L1-RSRP beam measurement is a method in which the terminal determines an optimal receive beam of the terminal by measuring an RSRP of a reference signal configured by a network device. The reference signal may be a CSI-RS, or may be an SSB.

The L1-RSRP beam measurement includes: 5.1. SSB-based L1-RSRP beam measurement; 5.2. CSI-RS-based L1-RSRP beam measurement. Descriptions are provided below separately.

5.1. SSB-Based L1-RSRP Beam Measurement

In the SSB-based L1-RSRP beam measurement, a reference signal configured by the network device is an SSB resource. The terminal measures RSRPs of different receive beams by using the SSB resource. The terminal determines a receive beam with a best RSRP value as the optimal receive beam of the terminal.

The TS 38.133 protocol defines requirements on a periodicity of the L1-RSRP beam measurement. A requirement on a periodicity of the SSB-based L1-RSRP beam measurement is shown in the following Table 1:

TABLE 1

| Configuration | Measurement periodicity |
| --- | --- |
| Non-DRX (non-DRX) | max($T_{Report}$, $\lceil M \times P \times N \rceil \times T_{SSB}$) |
| DRX cycle ≤ 320 ms | max($T_{Report}$, $\lceil 1.5 \times M \times P \times N \rceil \times$ max($T_{DRX}$, $T_{SSB}$)) |
| DRX cycle > 320 ms | $\lceil 1.5 \times M \times P \times N \rceil \times T_{DRX}$ |

$T_{Report}$ is a preconfigured measurement periodicity, $T_{SSB}$ is a periodicity of the SSB resource configured by the network device for the L1-RSRP beam measurement, and $T_{DRX}$ is the DRX periodicity. M is a quantity of samples in the periodicity of the L1-RSRP beam measurement, and indicates that the terminal needs to perform M rounds of beam measurement in one periodicity of the L1-RSRP beam measurement. N is a first parameter recorded in this application, and indicates that time required by the terminal for each round of beam measurement is N×$T_{SSB}$. P is a measurement relaxation factor, and indicates time reserved for other behavior, for example, time reserved for mobility measurement of the terminal.

In the SSB-based L1-RSRP beam measurement, the network device does not configure a QCL relationship of the SSB, and the terminal cannot determine an optimal receive beam corresponding to each SSB. The terminal may perform beam sweeping based on the SSB, to determine the optimal receive beam corresponding to each SSB.

A process in which the terminal performs beam sweeping based on the SSB is as follows: The terminal sequentially measures RSRP values of a same SSB by using different receive beams of the terminal. The terminal determines, based on the RSRP values of the SSB that are measured on the receive beams, an optimal receive beam corresponding to the SSB. The terminal can complete beam sweeping on one receive beam in one SSB periodicity. It is defined in a current protocol that a maximum quantity of receive beams supported by the terminal is 8. Therefore, the terminal may determine, by using eight SSB periodicities, the optimal receive beam corresponding to the SSB, and further determine an optimal receive beam used by the terminal to report an L1-RSRP.

Therefore, in the SSB-based L1-RSRP beam measurement, it is defined that N=8 (in other words, a value of the first parameter is 8). This ensures that in each round of beam sweeping, the terminal can complete beam sweeping on eight receive beams, and further determine the optimal receive beam corresponding to the terminal.

5.2. CSI-RS-Based L1-RSRP Beam Measurement

In the CSI-RS-based L1-RSRP beam measurement, a reference signal configured by the network device is a CSI-RS resource. The terminal measures RSRPs of different receive beams by using the CSI-RS resource. The terminal determines a receive beam with a best RSRP value as the optimal receive beam of the terminal.

The TS 38.133 protocol defines requirements on a periodicity of the L1-RSRP beam measurement. A requirement on a periodicity of the CSI-RS-based L1-RSRP beam measurement is shown in the following Table 2:

TABLE 2

| Configuration | Measurement periodicity |
| --- | --- |
| Non-DRX (non-DRX) | max($T_{Report}$, $\lceil M \times P \times N \rceil \times T_{CSI-RS}$) |
| DRX cycle ≤ 320 ms | max($T_{Report}$, $\lceil 1.5 \times M \times P \times N \rceil \times$ max($T_{DRX}$, $T_{CSI-RS}$)) |
| DRX cycle > 320 ms | $\lceil 1.5 \times M \times P \times N \rceil \times T_{DRX}$ |

The $T_{CSI-RS}$ is a periodicity of the CSI-RS configured by the network device for an L1-RSRP. Meanings of M, N, P, and $T_{DRX}$ are the same as those in Table 1. Details are not described herein again.

In the CSI-RS-based L1-RSRP beam measurement, the terminal performs beam measurement for each CSI-RS resource set. The terminal may determine a beam measurement manner based on a repetition (repetition) parameter of the CSI-RS resource set, and further determine a value of N. There are the following two scenarios for the repetition (repetition) parameter of the CSI-RS resource set, where the two scenarios are: a scenario a: repetition is set to "off"; a scenario b: repetition is set to "on". Details are described below separately.

Scenario a: Repetition is Set to "Off".

When repetition of the CSI-RS resource set is set to "off", the network device configures a corresponding reference signal (Reference Signal, RS) for each CSI-RS resource in the CSI-RS resource set, for example, configures an SSB or a CSI-RS. There is a "QCL-TypeD" relationship between the CSI-RS resource and the corresponding RS. Each RS in the foregoing RSs has a corresponding optimal receive beam.

In this way, the terminal may determine, based on the RS corresponding to each CSI-RS and an optimal receive beam corresponding to the RS, an optimal receive beam corresponding to the CSI-RS. Specifically, the terminal measures, by using the CSI-RS resource, an RSRP of the optimal receive beam corresponding to the CSI-RS resource, and further determines the optimal receive beam corresponding to the terminal. Therefore, the terminal only needs to determine, in one CSI-RS periodicity, the optimal receive beam corresponding to the CSI-RS resource in optimal receive beams of RSs corresponding to CSI-RS resources. Based on this, in the scenario a, the terminal determines that N=1. In other words, time required by the terminal for each round of beam measurement is one CSI-RS periodicity.

It should be noted that when the repetition parameter of the CSI-RS resource set is set to "off", if one or more CSI-RSs in the CSI-RS resource set have no corresponding RS (in other words, have no RS having a "QCL-TypeD" relationship with the CSI-RS), the terminal determines that a configuration of the CSI-RS resource set is incorrect, and the terminal may cancel L1-RSRP measurement on the CSI-RS resource set.

Scenario b: Repetition is Set to "On".

When the repetition parameter of the CSI-RS resource set is set to "on", the terminal determines that all CSI-RS resources in the CSI-RS resource set are sent by the network device by using a same transmit beam. In this case, the terminal may separately sweep the transmit beam by using different receive beams, to determine an optimal receive beam that matches the transmit beam. Details are as follows:

The terminal receives, by using each receive beam, a CSI-RS resource configured by the network device. The terminal performs beam measurement on each receive beam by using the CSI-RS resource, to determine an L1-RSRP value corresponding to each receive beam. The terminal determines, based on the L1-RSRP value corresponding to each receive beam, the optimal receive beam corresponding to the terminal.

It should be noted that a quantity of receive beams that can be measured by the terminal in one CSI-RS periodicity is equal to a quantity of CSI-RS resources in the CSI-RS resource set. In one CSI-RS periodicity, each CSI-RS resource in the CSI-RS resource set corresponds to one receive beam. The terminal measures, by using the CSI-RS resource, an L1-RSRP of the receive beam corresponding to the CSI-RS resource. Therefore, the terminal requires $\lceil R/K \rceil$ CSI-RS periodicities to determine the optimal receive beam of the terminal. Based on this, the terminal determines that $N=\lceil R/K \rceil$. A value of R is a maximum quantity of receive beams (maxNumberRxBeam) that is reported when the terminal performs capability reporting, and a value of K is the quantity of CSI-RS resources in the CSI-RS resource set.

For example, if the maximum quantity of receive beams that is reported when the terminal performs capability reporting is 8, and the CSI-RS resource set includes three CSI-RS resources. In one CSI-RS periodicity, the terminal can complete L1-RSRP measurement of three receive beams based on the three CSI-RS resources. Therefore, the terminal requires three CSI-RS periodicities to complete L1-RSRP measurement of eight receive beams.

6. L1-SINR Beam Measurement

In Rel-16 NR, a terminal supports beam measurement performed based on an L1-SINR. The L1-SINR beam measurement is a method in which the terminal determines an optimal receive beam of the terminal by measuring an SINR of a reference signal configured by a network device. The reference signal may be a CSI-RS, or may be an SSB.

In the L1-SINR beam measurement, there are the following two beam measurement scenarios: a scenario 1 and a scenario 2. In the scenario 1, only a CMR is configured. In the scenario 2, both a CMR and an IMR are configured. Descriptions are provided below separately.

Scenario 1: Only the CMR is Configured (CMR Only).

In the scenario 1, the network device only configures the CMR resource for the terminal, and the terminal performs L1-SINR beam measurement based on the CMR resource, to determine the optimal receive beam of the terminal.

It should be noted that, in the scenario 1, the CMR is one or more CSI-RS resources in a CSI-RS resource set.

In the scenario 1, a requirement on a periodicity of CSI-RS-based L1-SINR beam measurement is shown in the following Table 3:

TABLE 3

| Configuration | Measurement periodicity |
| --- | --- |
| Non-DRX (non-DRX) | $\max(T_{Report}, \lceil M \times P \times N \rceil \times T_{CSI-RS})$ |
| DRX cycle ≤ 320 ms | $\max(T_{Report}, \lceil 1.5 \times M \times P \times N \rceil \times \max(T_{DRX}, T_{CSI-RS}))$ |
| DRX cycle > 320 ms | $\lceil 1.5 \times M \times P \times N \rceil \times T_{DRX}$ |

Scenario 2: The CMR and the IMR are Configured.

In the scenario 2, the network device configures the CMR and the IMR resource corresponding to the CMR for the terminal. The terminal determines the optimal receive beam of the terminal based on the CMR and the IMR corresponding to the CMR.

It should be noted that, in the scenario 2, the CMR may be a CSI-RS resource, or may be an SSB resource. The IMR is a CSI-RS resource (where the CSI-RS resource is either an NZP-CSI-RS resource or a ZP-CSI-RS resource).

Based on different resources forming the CMR and the IMR, the scenario 2 may be specifically implemented as the following four scenarios: a scenario 2A, a scenario 2B, a scenario 2C, and a scenario 2D.

In the scenario 2A, the CMR is configured as an SSB resource, and the IMR is configured as a ZP-CSI-RS resource.

In the scenario 2B, the CMR is configured as a CSI-RS resource, and the IMR is configured as a ZP-CSI-RS resource.

In the scenario 2C, the CMR is configured as an SSB resource, and the IMR is configured as an NZP-CSI-RS resource.

In the scenario 2D, the CMR is configured as a CSI-RS resource, and the IMR is configured as an NZP-CSI-RS resource.

In the scenario 2, based on resource types of the CMR, the L1-SINR beam measurement may be classified into two scenarios: a scenario 2.1 and a scenario 2.2. In the scenario 2.1, the CMR is an SSB resource. In the scenario 2.2, the CMR is a CSI-RS resource. Descriptions are provided below separately.

Scenario 2.1: The CMR is an SSB Resource.

In this scenario, a requirement on a periodicity of the L1-SINR beam measurement is shown in the following Table 4:

TABLE 4

| Configuration | Measurement periodicity |
| --- | --- |
| Non-DRX (non-DRX) | $\max(T_{Report}, \lceil M \times P \times N \rceil \times T_{CSI-RS})$ |
| DRX cycle ≤ 320 ms | $\max(T_{Report}, \lceil 1.5 \times M \times P \times N \rceil \times \max(T_{DRX}, T_{CSI-RS}))$ |
| DRX cycle > 320 ms | $\lceil 1.5 \times M \times P \times N \rceil \times T_{DRX}$ |

It should be noted that, in the scenario 2.1, a manner in which the terminal performs beam measurement and a periodicity in which the terminal performs beam measurement are similar to those in "5.1. SSB-based L1-RSRP beam measurement". Details are not described herein again.

Scenario 2.2: The CMR is a CSI-RS Resource.

In this scenario, a requirement on a periodicity of the L1-SINR beam measurement is shown in the following Table 5:

TABLE 5

| Configuration | Measurement periodicity |
|---|---|
| Non-DRX (non-DRX) | max($T_{Report}$, $\lceil M \times P \times N \rceil \times T_{CSI-RS}$) |
| DRX cycle ≤ 320 ms | max($T_{Report}$, $\lceil 1.5 \times M \times P \times N \rceil \times$ max($T_{DRX}$, $T_{CSI-RS}$)) |
| DRX cycle > 320 ms | $\lceil 1.5 \times M \times P \times N \rceil \times T_{DRX}$ |

In the scenario 2.2, the network device configures the CMR and the IMR for the terminal, and both the CMR and the IMR are CSI-RS resources. Because the network device configures both the CMR and the IMR for the terminal, when performing beam measurement, the terminal may perform beam measurement based on both the CMR and the IMR. In this case, how the terminal performs beam measurement and how to properly define a value of a first parameter are not specified in a current standard. Beam measurement behavior of the terminal in the scenario 2.2 will be further discussed, to determine the value of the first parameter.

Based on the foregoing technical problem, this application defines and standardizes the measurement behavior of the terminal and the value of the first parameter in the scenario in which L1-SINR beam measurement is performed based on the CMR and the IMR. The following provides descriptions by using embodiments as examples.

Embodiment 1

Figure 2:
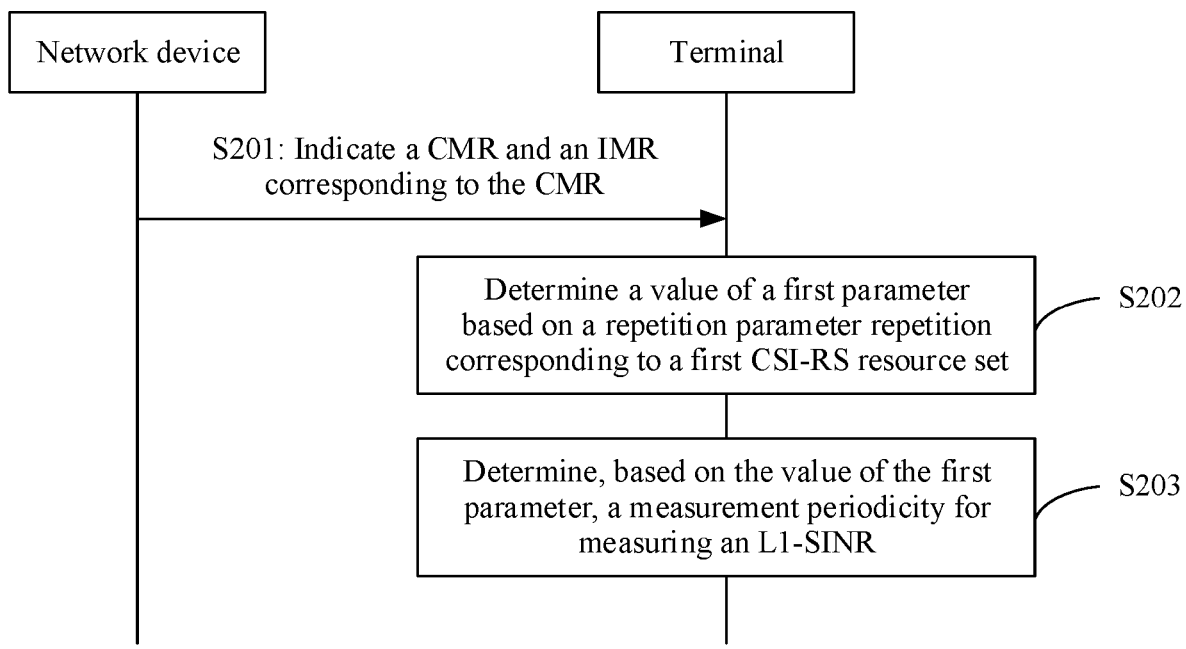
FIG. 2 is a schematic flowchart of a communication method according to an embodiment of this application.

This embodiment provides a communication method. As shown in FIG. 2, the communication method includes S201, S202, and S203.

S201: A network device indicates, to a terminal, a CMR and an IMR corresponding to the CMR. Correspondingly, the terminal receives the CMR and the IMR corresponding to the CMR that are indicated by the network device.

The CMR and the IMR are used to measure an L1-SINR, and an L1-SINR beam measurement result is used for beam management (for example, beam measurement, and determining of an optimal receive beam). The CMR includes one or more CSI-RS resources in a first CSI-RS resource set, and the IMR includes one or more CSI-RS resources in a second CSI-RS resource set. The first CSI-RS resource set and the second CSI-RS resource set are different CSI-RS resource sets.

The CSI-RS resource in the first CSI-RS resource set may also be referred to as a first CSI-RS resource. The CSI-RS resource in the second CSI-RS resource set may also be referred to as a second CSI-RS resource.

S202: The terminal determines a value of a first parameter based on a repetition parameter repetition corresponding to the first CSI-RS resource set.

The first parameter is a parameter required for determining a measurement periodicity of the L1-SINR.

In the following descriptions, the repetition parameter repetition is denoted as repetition. repetition indicates whether the network device sends the one or more first CSI-RS resources in the first CSI-RS resource set by using a same transmit beam.

For example, if repetition corresponding to the first CSI-RS resource set is set to "on", it indicates that the network device sends the one or more first CSI-RS resources in the first CSI-RS resource set by using a same transmit beam (for example, a transmit beam a).

If repetition corresponding to the first CSI-RS resource set is set to "off", it indicates that the network device may separately send different first CSI-RS resources in the first CSI-RS resource set by using different transmit beams.

In a possible implementation, if repetition corresponding to the first CSI-RS resource set is set to "on", the terminal determines that the value of the first parameter is $\lceil R/K \rceil$, or the value of the first parameter is $\lceil R/\min(K, L) \rceil$. If repetition corresponding to the first CSI-RS resource set is set to "off", the terminal determines that the value of the first parameter is 1.

A value of R is a maximum quantity of receive beams that is reported when the terminal performs capability reporting, min(K, L) indicates that a smaller value in K and L is used, a value of K is a quantity of CSI-RS resources in the first CSI-RS resource set, and a value of L is a quantity of CSI-RS resources in the second CSI-RS resource set.

It should be noted that, in this embodiment, a setting of repetition of the first CSI-RS resource set is the same as a setting of repetition of the second CSI-RS resource set.

S203: The terminal determines, based on the value of the first parameter, the measurement periodicity for measuring the L1-SINR.

In a possible implementation, the terminal determines a value of the measurement periodicity $T_{L1-SINR}$ of L1-SINR beam measurement according to the following formula 1:

$$T_{L1-SINR} = \lceil M \times P \times N \rceil \times T_{CMR\_CSI-RS} \quad \text{Formula 1}$$

M is a quantity of samples corresponding to the measurement periodicity of the L1-SINR beam measurement, P is a measurement relaxation factor, N is the first parameter, and $T_{CMR\_CSI-RS}$ is a periodicity corresponding to the CMR.

For meanings of the parameters M, N, and P, refer to the foregoing descriptions of the parameters M, N, and P in "5.1. SSB-based L1-RSRP beam measurement". Details are not described herein again.

Based on the foregoing technical solution, in Embodiment 1 of this application, the terminal determines the value of the first parameter based on repetition of the first CSI-RS resource set. Therefore, a specific value of the first parameter in a scenario in which the L1-SINR beam measurement is performed based on the CMR and the IMR is specified. In this way, the terminal may determine, based on the value of the first parameter, the measurement periodicity for performing L1-SINR beam measurement based on the CMR and the IMR.

Figure 3:
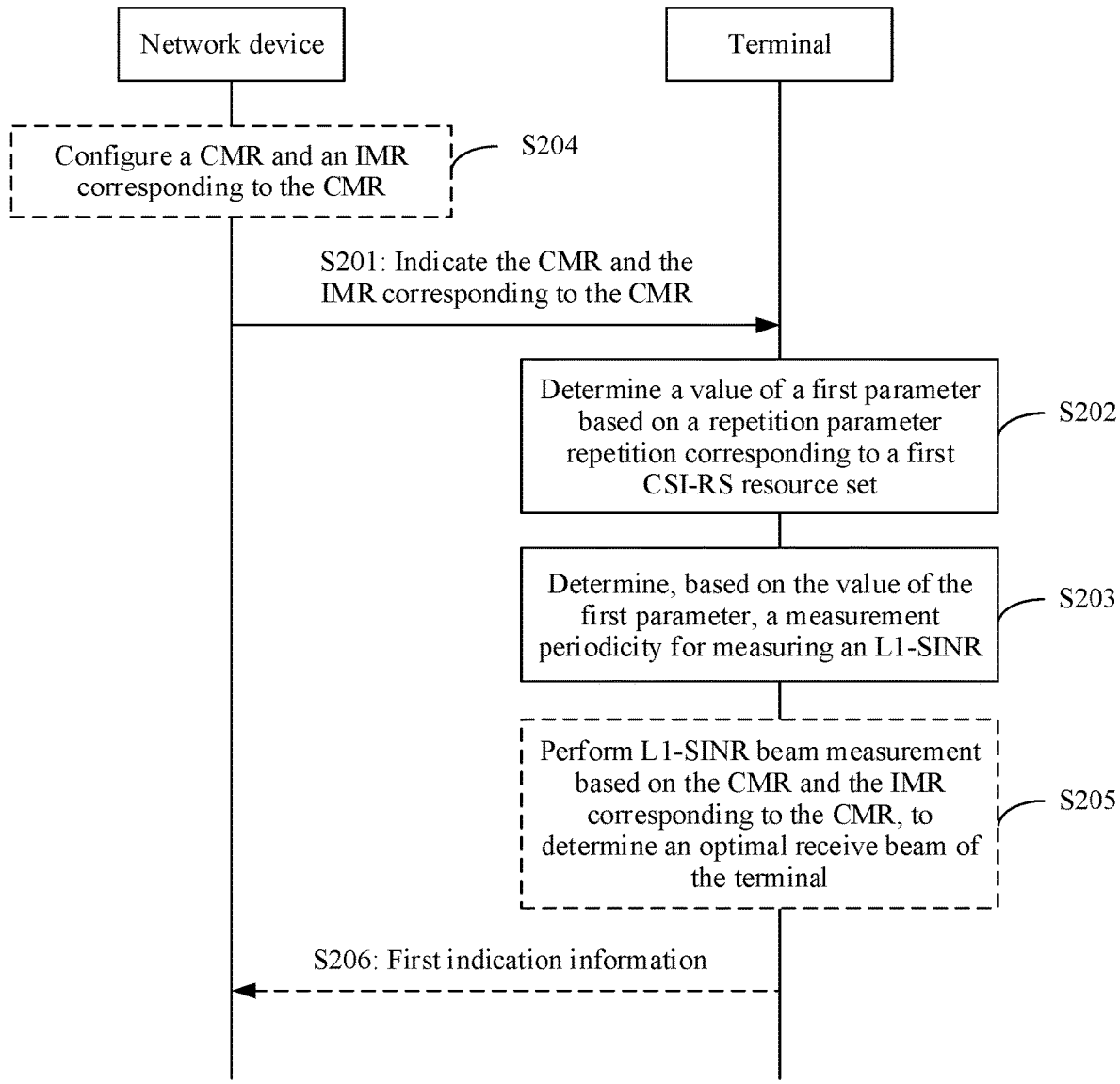
FIG. 3 is a schematic flowchart of another communication method according to an embodiment of this application.

With reference to FIG. 2, as shown in FIG. 3, before S201, the communication method provided in this embodiment of this application further includes S204.

S204: The network device configures the CMR and the IMR corresponding to the CMR.

In a possible implementation, a process in which the network device configures the CMR is as follows: The network device determines the first CSI-RS resource set. The first CSI-RS resource set includes K CSI-RS resources. The network device configures the K CSI-RS resources in the first CSI-RS resource set as the CMR.

A process in which the network device configures the IMR corresponding to the CMR is as follows: The network device determines the second CSI-RS resource set. The second CSI-RS resource set includes L CSI-RS resources. The network device configures the L CSI-RS resources in the second CSI-RS resource set as the IMR. Then, the network device determines a correspondence between the K CSI-RS resources in the first CSI-RS resource set and the L CSI-RS resources in the second CSI-RS resource set. The network device determines, based on the correspondence, that the IMR is an IMR corresponding to the CMR. K may be equal or unequal to L.

In the CMR and the IMR that have the correspondence, one first CSI-RS resource in the CMR may correspond to one or more second CSI-RS resources in the IMR. Similarly, one second CSI-RS resource in the IMR may correspond to one or more first CSI-RS resources in the CMR.

Figure 4:
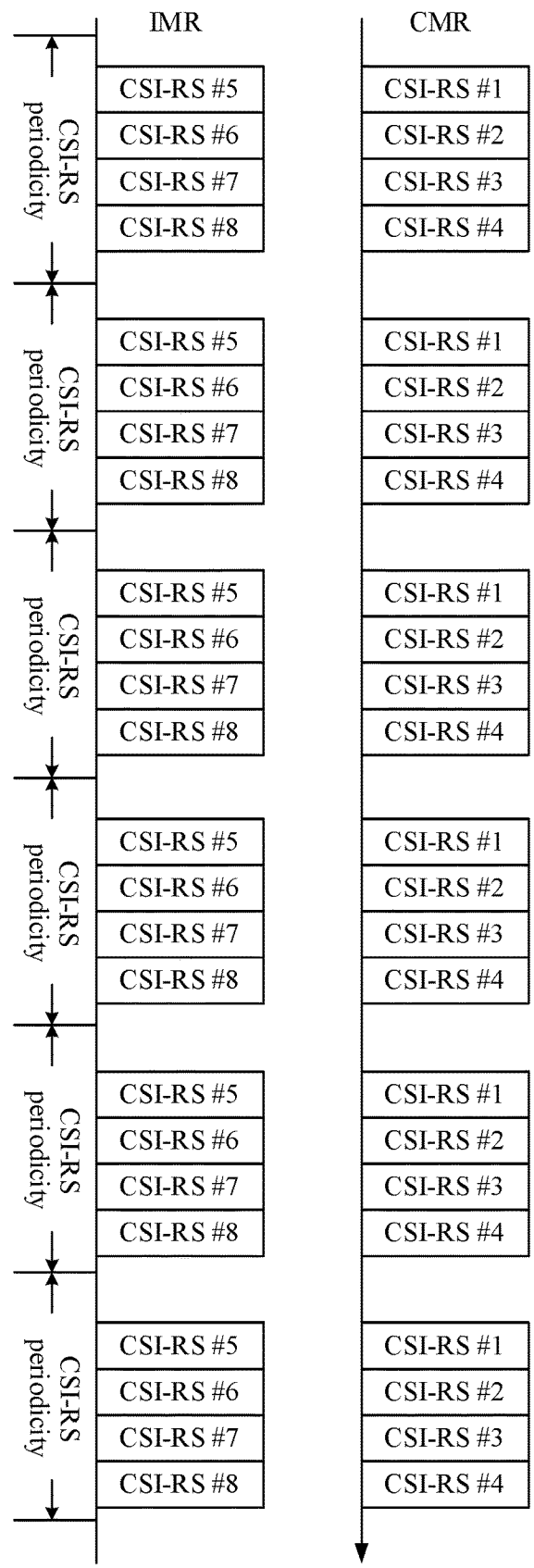
FIG. 4 is a schematic diagram of a CMR configured by a network device and an IMR corresponding to the CMR according to an embodiment of this application.

In an example, the CMR and the IMR corresponding to the CMR that are configured by the network device are shown in FIG. 4.

As shown in FIG. 4, the first CSI-RS resource set includes four CSI-RS resources: a CSI-RS #1, a CSI-RS #2, a CSI-RS #3, and a CSI-RS #4. The second CSI-RS resource set includes four CSI-RS resources: a CSI-RS #5, a CSI-RS #6, a CSI-RS #7, and a CSI-RS #8.

The network device configures the four CSI-RS resources included in the first CSI-RS resource as the CMR. Correspondingly, the CMR includes the four CSI-RS resources included in the first CSI-RS resource.

The network device configures the four CSI-RS resources included in the second CSI-RS resource as the IMR. Correspondingly, the IMR includes the four CSI-RS resources included in the second CSI-RS resource.

The network device configures one CMR and one IMR in one CSI-RS periodicity. In this way, there is a one-to-one correspondence between the CMR and the IMR in one CSI-RS periodicity. In addition, there is also a correspondence between the first CSI-RS resource in the CMR and the second CSI-RS resource in the IMR. For example, the CSI-RS #1 corresponds to the CSI-RS #5, the CSI-RS #2 corresponds to the CSI-RS #6, the CSI-RS #3 corresponds to the CSI-RS #7, and the CSI-RS #4 corresponds to the CSI-RS #8.

In a next CSI-RS periodicity, the network device configures the CMR and the IMR by using the same method. In this way, the terminal may separately perform beam measurement on different receive beams in a plurality of CSI-RS periodicities, to determine beam quality of a plurality of beams, and perform beam management.

Based on the foregoing technical solution, the network device configures the CMR and the IMR for the terminal. In this way, the terminal may measure a power of a wanted signal of the beam based on the CMR, and the terminal may measure an interference and a noise of the beam based on the IMR. Further, the terminal may complete L1-SINR beam measurement on the receive beam.

In an implementation of S202, there are two cases for repetition corresponding to the first CSI-RS resource set, where the two cases are a case 1 and a case 2. In the case 1, repetition is set to "off". In the case 2, repetition is set to "on". The case 1 and the case 2 are described in detail below separately.

Case 1: repetition is set to "off".

In the case 1, the terminal determines that the value of the first parameter is 1.

It should be noted that when repetition corresponding to the first CSI-RS resource set is set to "off", the network device configures a corresponding measurement resource for each first CSI-RS resource. There is a "QCL-TypeD" relationship between the first CSI-RS resource and the corresponding measurement resource. The measurement resource corresponding to each first CSI-RS resource has a corresponding optimal receive beam.

The terminal may determine, based on the optimal receive beam corresponding to the measurement resource corresponding to the first CSI-RS resource, an optimal receive beam corresponding to the first CSI-RS resource. For example, the terminal may determine the optimal receive beam corresponding to the measurement resource corresponding to the first CSI-RS resource as the optimal receive beam corresponding to the first CSI-RS resource.

The measurement resource may be an SSB (denoted as a case 1.1), or a CSI-RS resource in a third CSI-RS resource set (denoted as a case 1.2). Descriptions are provided below separately.

Case 1.1: The measurement resource is the SSB.

When the measurement resource is the SSB, the SSB is a CMR that can be used to measure the L1-SINR, or the SSB is a CMR that can be used to measure an L1-RSRP.

In this case, the terminal determines an optimal receive beam corresponding to the SSB as an optimal receive beam corresponding to a first CSI-RS resource that has a "QCL-TypeD" relationship with the SSB.

For example, the first CSI-RS resource set includes four first CSI-RS resources: a CSI-RS #1, a CSI-RS #2, a CSI-RS #3, and a CSI-RS #4. The network device separately configures, for the four first CSI-RS resources, SSBs that have "QCL-TypeD" relationships with the four first CSI-RS resources. The CSI-RS #1 corresponds to an SSB #1, the CSI-RS #2 corresponds to an SSB #2, the CSI-RS #3 corresponds to an SSB #3, and the CSI-RS #4 corresponds to an SSB #4.

An optimal receive beam corresponding to the SSB #1 is a beam 1, an optimal receive beam corresponding to the SSB #2 is a beam 2, an optimal receive beam corresponding to the SSB #3 is a beam 3, and an optimal receive beam corresponding to the SSB #4 is a beam 4. Based on this, the terminal determines that an optimal receive beam corresponding to the CSI-RS #1 is the beam 1, the terminal determines that an optimal receive beam corresponding to the CSI-RS #2 is the beam 2, the terminal determines that an optimal receive beam corresponding to the CSI-RS #3 is the beam 3, and the terminal determines that an optimal receive beam corresponding to the CSI-RS #4 is the beam 4.

Case 1.2: The measurement resource is the CSI-RS resource in the third CSI-RS resource set.

repetition of the third CSI-RS resource set is set to "on". The first CSI-RS resource set, the second CSI-RS resource set, and the third CSI-RS resource set are different from each other. The CSI-RS resource in the third CSI-RS resource set may also be referred to as a third CSI-RS resource.

The third CSI-RS resource is a CMR that can be used to measure the L1-SINR, or the third CSI-RS resource is a CMR that can be used to measure an L1-RSRP.

In this case, the terminal determines an optimal receive beam corresponding to the third CSI-RS resource as an optimal receive beam corresponding to a first CSI-RS resource that has a "QCL-TypeD" relationship with the third CSI-RS resource.

For example, the first CSI-RS resource set includes four first CSI-RS resources: a CSI-RS #1, a CSI-RS #2, a CSI-RS #3, and a CSI-RS #4. The third CSI-RS resource set includes four third CSI-RS resources: a CSI-RS #9, a CSI-RS #10, a CSI-RS #11, and a CSI-RS #12. The CSI-RS #1 corresponds to the CSI-RS #9, the CSI-RS #2 corresponds to the CSI-RS #10, the CSI-RS #3 corresponds to the CSI-RS #11, and the CSI-RS #4 corresponds to the CSI-RS #12.

An optimal receive beam corresponding to the CSI-RS #9 is a beam 1, an optimal receive beam corresponding to the CSI-RS #10 is a beam 2, an optimal receive beam corresponding to the CSI-RS #11 is a beam 3, and an optimal receive beam corresponding to the CSI-RS #12 is a beam 4. Based on this, the terminal determines that an optimal receive beam corresponding to the CSI-RS #1 is the beam 1, the terminal determines that an optimal receive beam corresponding to the CSI-RS #2 is the beam 2, the terminal determines that an optimal receive beam corresponding to the CSI-RS #3 is the beam 3, and the terminal determines that an optimal receive beam corresponding to the CSI-RS #4 is the beam 4.

It should be noted that when the measurement resource is the SSB or the CSI-RS resource in the third CSI-RS resource set, the terminal periodically performs beam measurement based on the measurement resource, to determine an optimal receive beam corresponding to the resource. Therefore, there is a corresponding optimal receive beam for the measurement resource in each periodicity, and the optimal receive beam corresponding to the measurement resource is updated in a next periodicity. In this way, the measurement resource always has a corresponding optimal receive beam. Based on this, regardless of when the terminal performs beam measurement based on the first CSI-RS resource, the terminal may determine, based on the measurement resource that has the "QCL-TypeD" relationship with the CSI-RS resource, the optimal receive beam corresponding to the CSI-RS resource.

It can be learned based on the foregoing technical solution that, in the case 1, regardless of whether the measurement resource configured by the network device for the first CSI-RS resource is the SSB or the third CSI-RS resource, the terminal may determine, based on the measurement resource, the optimal receive beam corresponding to the first CSI-RS resource.

Therefore, in one CSI-RS periodicity, the terminal measures, based on the first CSI-RS resource, a power of a wanted signal of the optimal receive beam corresponding to the first CSI-RS resource. The terminal measures an interference and a noise of the corresponding optimal receive beam based on the second CSI-RS resource. Further, the terminal determines an L1-SINR of each optimal receive beam based on a power of a wanted signal, an interference, and a noise of each optimal receive beam. Finally, the terminal reports one or more L1-SINRs in L1-SINRs of optimal receive beams to the network device.

In addition, the terminal may further determine, in these optimal receive beams based on the L1-SINR of each optimal receive beam, an optimal receive beam corresponding to the terminal. In other words, in the case 1, the terminal may determine the optimal receive beam of the terminal in one CSI-RS periodicity. Therefore, in the case 1, the value of the first parameter is defined as 1.

Case 2: repetition is set to "on".

In the case 2, the terminal determines that the value of the first parameter is $\lceil R/K \rceil$, or the value of the first parameter is $\lceil R/\min(K, L) \rceil$.

It should be noted that when repetition corresponding to the first CSI-RS resource set is set to "on", the network device sends the one or more first CSI-RS resources by using a same transmit beam.

In this case, the network device configures, for each first CSI-RS resource, a measurement resource having a QCL relationship with the first CSI-RS resource. However, the measurement resource may not be a CMR that can be used to measure the L1-SINR or the L1-SINR. In this way, the measurement resource may indicate only broad beam information (for example, a receive beam direction). In this case, the terminal may determine a plurality of receive beams based on the beam information indicated by the measurement resource, and determine L1-SINRs of the plurality of receive beams. A quantity of the plurality of receive beams selected by the terminal is less than or equal to R, in other words, less than or equal to the maximum quantity of receive beams that is reported when the terminal performs capability reporting.

It should be noted that, because the one or more first CSI-RS resources are sent by the network device by using the same transmit beam, the terminal may separately perform matching with the transmit beam by using different receive beams, and receive the CSI-RS resource sent by the network device by using the transmit beam, to determine an L1-SINR corresponding to each receive beam.

If the first CSI-RS resource set includes K first CSI-RS resources, the terminal can sweep a maximum of K receive beams in one CSI-RS periodicity. In one CSI-RS periodicity, one receive beam corresponds to one CSI-RS resource. A CSI-RS resource may correspond to different receive beams in different CSI-RS periodicities.

An example in which the first CSI-RS resource includes four first CSI-RS resources and the terminal determines eight receive beams is used below for description.

In the first CSI-RS resource periodicity, the terminal respectively receives the four first CSI-RS resources by using four receive beams in the eight receive beams. The terminal determines a power of a wanted signal of a receive beam based on a first CSI-RS resource received by using the receive beam. The terminal receives a second CSI-RS resource by using the same method, and determines an interference and a noise of the receive beam. The terminal determines an L1-SINR of the receive beam based on the power of the wanted signal, the interference, and the noise of the receive beam.

In the second CSI-RS resource periodicity, the terminal respectively receives the four first CSI-RS resources by using the remaining four receive beams in the eight receive beams, and determines L1-SINRs of the remaining four receive beams according to the same method described above.

The terminal may determine an optimal receive beam based on L1-SINRs of all the eight receive beams. Finally, the terminal reports an L1-SINR of the optimal receive beam to the network device.

In a possible implementation, when K is not equal to L, a quantity of receive beams measured by the terminal in one CSI-RS periodicity is a smaller value in K and L. In other words, the quantity of receive beams that can be measured by the terminal in one CSI-RS periodicity is determined by a smaller value of the quantity of first CSI-RS resources and the quantity of second CSI-RS resources.

For example, if the quantity of first CSI-RS resources is 3, and the quantity of second CSI-RS resources is 4, the terminal can measure three receive beams in one CSI-RS periodicity.

It can be learned based on the foregoing technical solution that the terminal determines that time required by the terminal to determine the optimal receive beam of the terminal in the case 2 is $\lceil R/\min(K, L) \rceil$ CSI-RS periodicities. Therefore, in the case 2, the value of the first parameter is defined as $\lceil R/\min(K, L) \rceil$. When K=L, the value of the first parameter may also be defined as $\lceil R/K \rceil$.

With reference to FIG. 2, as shown in FIG. 3, after S203, the method provided in this embodiment of this application further includes S205.

S205: The terminal performs L1-SINR beam measurement based on the CMR and the IMR corresponding to the CMR, to determine the optimal receive beam of the terminal.

A manner in which the terminal performs L1-SINR beam measurement is related to a setting of repetition. When repetition is set to "off", the terminal performs L1-SINR beam measurement in a manner 1. When repetition is set to "on", the terminal performs L1-SINR beam measurement in a manner 2. The manner 1 corresponds to the case 1, and the manner 2 corresponds to the case 2. The manner 1 and the manner 2 are described in detail below.

Manner 1

Figure 5:
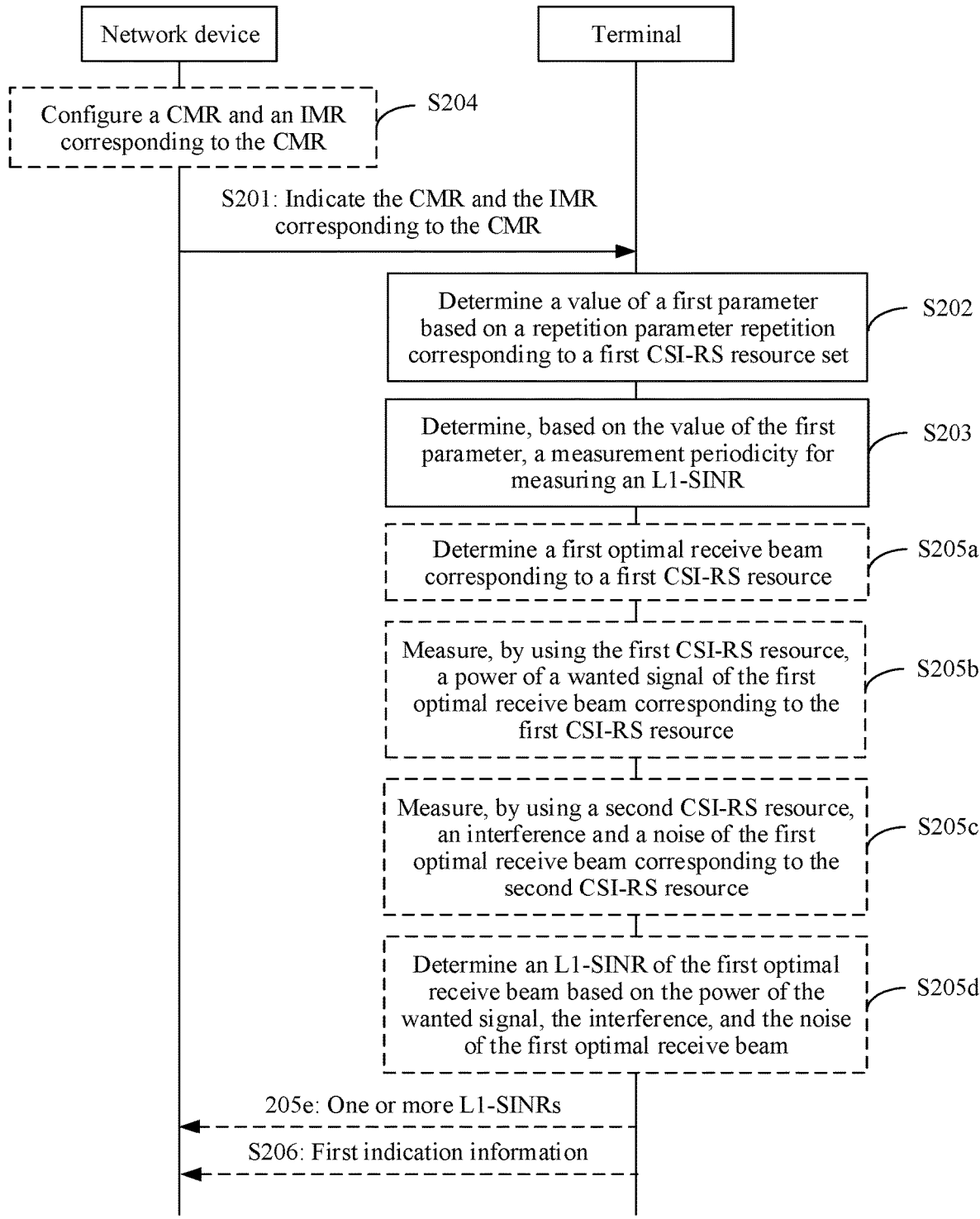
FIG. 5 is a schematic flowchart of another communication method according to an embodiment of this application.

With reference to FIG. 2 or FIG. 3, as shown in FIG. 5, when repetition is set to "off", the terminal performs the following S205a, S205b, S205c, S205d, and S205e.

S205a: The terminal determines a first optimal receive beam corresponding to the first CSI-RS resource.

One CSI-RS resource may correspond to one or more first optimal receive beams. Similarly, one first optimal receive beam may correspond to one or more CSI-RS resources.

In a possible implementation, when repetition is set to "off", it can be learned with reference to the case 1 that the terminal may determine the optimal receive beam corresponding to the measurement resource corresponding to the first CSI-RS resource as the optimal receive beam corresponding to the first CSI-RS resource.

It should be noted that the first optimal receive beam corresponding to the first CSI-RS resource is usually a receive beam that corresponds to the first CSI-RS resource and that has a highest power of a wanted signal.

S205b: The terminal measures, by using the first CSI-RS resource, a power of a wanted signal of the first optimal receive beam corresponding to the first CSI-RS resource.

For example, a first CSI-RS resource 1 corresponds to a first optimal receive beam a. The terminal receives, on the first optimal receive beam a, the first CSI-RS resource 1 indicated by the network device. The terminal measures a power of a wanted signal of the first optimal receive beam based on the first CSI-RS resource 1.

It should be noted that, because the first CSI-RS resource is configured as the CMR, the terminal measures the power of the wanted signal of the first optimal receive beam based on the first CSI-RS resource.

S205c: The terminal measures, by using the second CSI-RS resource, an interference and a noise of the first optimal receive beam corresponding to the second CSI-RS resource.

There is a correspondence between the second CSI-RS resource and the first CSI-RS resource. The terminal measures, by using the second CSI-RS resource, the interference and the noise of the optimal receive beam corresponding to the first CSI-RS resource that has the correspondence with the second CSI-RS resource.

One second CSI-RS resource may correspond to one or more first CSI-RS resources. Similarly, one first CSI-RS resource may correspond to one or more second CSI-RS resources.

For example, a second CSI-RS resource 2 corresponds to the first CSI-RS resource 1. The terminal receives the second CSI-RS resource 2 by using the first optimal receive beam a corresponding to the first CSI-RS resource 1. The terminal measures an interference and a noise of the first optimal receive beam a based on the second CSI-RS resource 2.

It should be noted that, because the second CSI-RS resource is configured as the IMR, the terminal measures the interference and the noise of the first optimal receive beam based on the second CSI-RS resource.

S205d: The terminal determines an L1-SINR of the first optimal receive beam based on the power of the wanted signal, the interference, and the noise of the first optimal receive beam.

For example, the terminal determines the L1-SINR of the first optimal receive beam by dividing the power of the wanted signal of the first optimal receive beam by the interference and the noise of the first optimal receive beam.

S205e: The terminal reports one or more L1-SINRs in L1-SINRs of first optimal receive beams to the network device.

The one or more L1-SINRs reported by the terminal to the network device are one or more L1-SINRs with larger values in the L1-SINRs of the first optimal receive beams. A quantity of L1-SINRs reported by the terminal to the network device may be determined based on a quantity of L1-SINRs that need to be reported as indicated by the network device. For example, if the network device indicates that the terminal needs to report three L1-SINRs, the terminal reports three L1-SINRs with larger values in the L1-SINRs of the first optimal receive beams to the network device.

In a possible implementation, the terminal may further determine the optimal receive beam of the terminal based on the L1-SINRs of the first optimal receive beams. For example, the terminal determines a first optimal receive beam with a largest L1-SINR in the first optimal receive beams as the optimal receive beam of the terminal.

In an example, with reference to FIG. 4 and the foregoing case 1, a process in which the terminal performs L1-SINR beam measurement in the manner 1 is described as follows:

The terminal determines that a receive beam corresponding to a measurement resource (an SSB or a CSI-RS) that has a "QCL-TypeD" relationship with the CSI-RS #1 is a beam 1. The terminal determines that a receive beam corresponding to a measurement resource that has a "QCL-TypeD" relationship with the CSI-RS #2 is a beam 2. The terminal determines that a receive beam corresponding to a measurement resource that has a "QCL-TypeD" relationship with the CSI-RS #3 is a beam 3. The terminal determines that a receive beam corresponding to a measurement resource that has a "QCL-TypeD" relationship with the CSI-RS #4 is a beam 5.

Based on this, in one CSI-RS periodicity, the terminal measures a power of a wanted signal of the beam 1 based on the CSI-RS #1, and measures an interference and a noise of the beam 1 based on the CSI-RS #5. The terminal determines an L1-SINR of the beam 1 based on the power of the wanted signal, the interference, and the noise of the beam 1.

The terminal measures a power of a wanted signal of the beam 2 based on the CSI-RS #2, and measures an interference and a noise of the beam 2 based on the CSI-RS #6. The terminal determines an L1-SINR of the beam 2 based on the power of the wanted signal, the interference, and the noise of the beam 2.

The terminal measures a power of a wanted signal of the beam 3 based on the CSI-RS #3, and measures an interference and a noise of the beam 3 based on the CSI-RS #7. The terminal determines an L1-SINR of the beam 3 based on the power of the wanted signal, the interference, and the noise of the beam 3.

The terminal measures a power of a wanted signal of the beam 4 based on the CSI-RS #4, and measures an interference and a noise of the beam 4 based on the CSI-RS #8. The terminal determines an L1-SINR of the beam 4 based on the power of the wanted signal, the interference, and the noise of the beam 4.

The terminal determines, based on the L1-SINRs of the beam 1, the beam 2, the beam 3, and the beam 4, one or more L1-SINRs used by the terminal for reporting.

In the manner 1, the terminal may determine, in one CSI-RS resource periodicity, the optimal receive beam corresponding to the terminal. The value of the first parameter is 1. Based on this, if the terminal determines that a value of a quantity M of samples in one beam measurement periodicity is 3 and a value of P is 2, the terminal determines that one beam measurement periodicity is 3×1×2=6 CSI-RS periodicities.

Based on the foregoing solution, in the case 1, the terminal determines the first optimal receive beam of the first CSI-RS resource based on the "QCL-TypeD" relationship of the first CSI-RS resource, so that the terminal may determine the first optimal receive beam corresponding to the first CSI-RS resource without performing beam sweeping. Therefore, the measurement periodicity in which the terminal performs L1-SINR beam measurement is greatly shortened, and power consumption of the terminal is further reduced.

Manner 2

Figure 6:
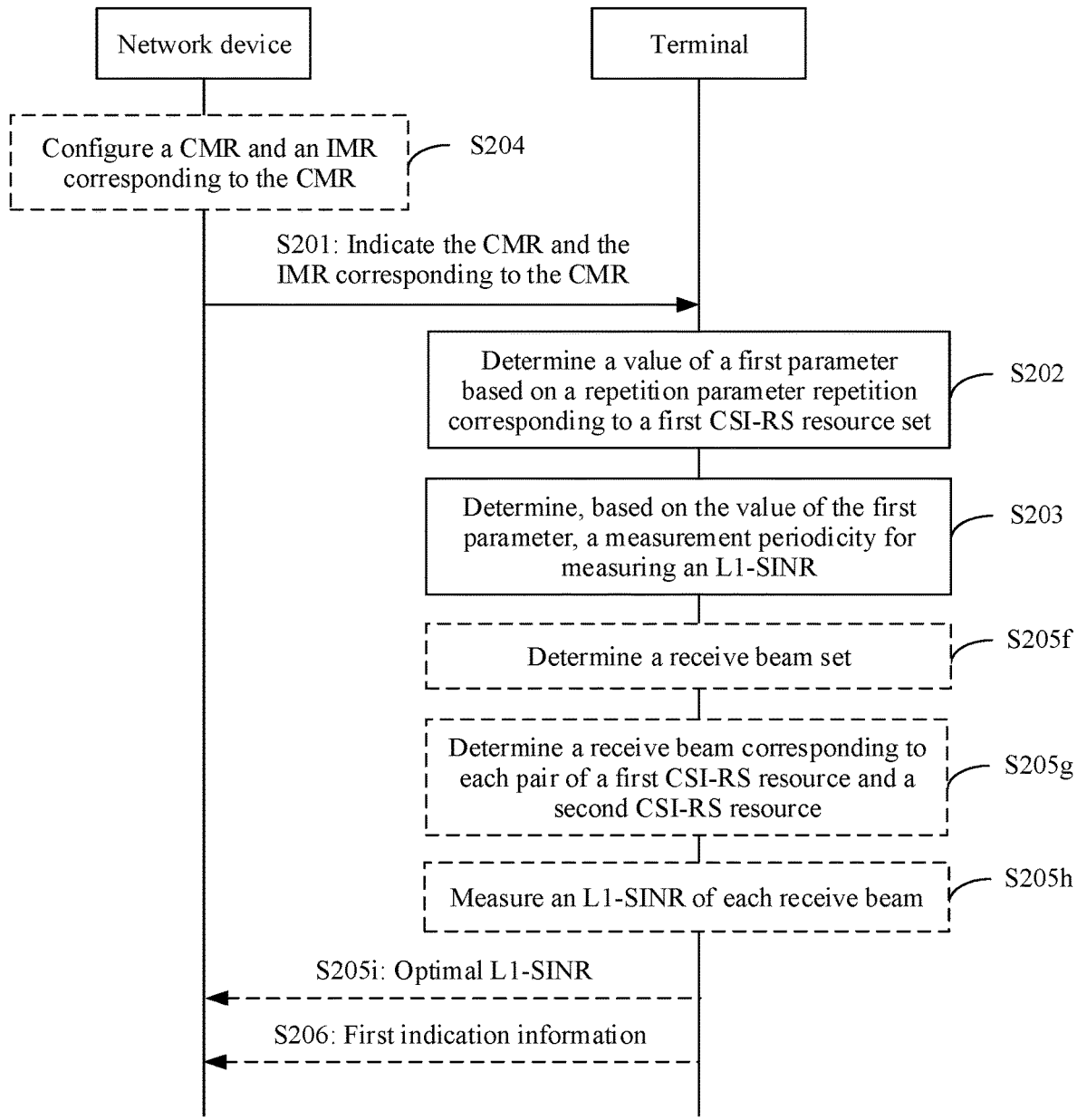
FIG. 6 is a schematic flowchart of another communication method according to an embodiment of this application.

With reference to FIG. 2, as shown in FIG. 6, when repetition is set to "on", the terminal performs the following S205*f*, S205*g*, S205*h*, and S205*i*.

S205*f*: The terminal determines a receive beam set.

The receive beam set may include a maximum of R receive beams, and a receive beam in the receive beam set is a receive beam determined by the terminal based on beam information indicated by a measurement resource that has a QCL relationship with a first CSI-RS resource.

S205*g*: The terminal determines a receive beam corresponding to each pair of a first CSI-RS resource and a second CSI-RS resource.

The receive beam is a receive beam in the receive beam set determined by the terminal in S205*f*.

In this embodiment, a first CSI-RS resource and a second CSI-RS resource that have a correspondence are referred to as a pair of the first CSI-RS resource and the second CSI-RS resource.

An example in which the receive beam set includes R receive beams is used below for description.

When R≤min(K, L), the terminal allocates a first CSI-RS resource to the receive beam in the following manner I. When R>min(K, L), the terminal allocates a first CSI-RS resource to the receive beam in the following manner II.

Manner I: The terminal allocates a different first CSI-RS resource to each receive beam.

Manner II: The terminal classifies the R receive beams into ⌈R/min(K, L)⌉ first receive beam sets. A quantity of receive beams in each first receive beam set is less than or equal to K. The terminal determines that the first CSI-RS resource set corresponds to each of the ⌈R/min(K, L)⌉ first receive beam sets. For each first receive beam set, the terminal allocates one first CSI-RS resource to each receive beam in the first receive beam set. One first CSI-RS resource may be allocated to receive beams in different first receive beam sets. One first CSI-RS resource can be allocated to only one receive beam in one first receive beam set.

It should be noted that when a quantity of receive beams in the receive beam set is less than R, the terminal may still determine, in the foregoing manner I and manner II, a receive beam corresponding to each pair of a first CSI-RS resource and a second CSI-RS resource.

S205*h*: The terminal measures an L1-SINR of each receive beam.

In a possible implementation, the terminal measures, by using a first CSI-RS resource, a power of a wanted signal of a receive beam corresponding to the first CSI-RS resource, and the terminal measures, based on a second CSI-RS resource, an interference and a noise of the receive beam corresponding to the second CSI-RS resource. The terminal determines an L1-SINR of the receive beam based on the power of the wanted signal, the interference, and the noise of the receive beam.

S205*i*: The terminal reports an optimal L1-SINR to the network device.

The optimal L1-SINR reported by the terminal to the network device is an L1-SINR with a largest value in L1-SINRs determined in S205*h*.

In an example, with reference to FIG. 4 and the foregoing case 2, a process in which the terminal performs L1-SINR beam measurement in the manner 2 is described as follows:

The terminal determines that the first CSI-RS resource set and the second CSI-RS resource set each include four CSI-RS resources. The first CSI-RS resource set is used to sweep eight receive beams: a beam 1, a beam 2, a beam 3, a beam 4, a beam 5, a beam 6, a beam 7, and a beam 8. The terminal can measure four receive beams in one CSI-RS periodicity. Therefore, the terminal requires two CSI-RS periodicities to complete measurement of the eight receive beams.

In the first CSI-RS resource periodicity:

The terminal measures a power of a wanted signal of the beam 1 based on the CSI-RS #1, and measures an interference and a noise of the beam 1 based on the CSI-RS #5. The terminal determines an L1-SINR of the beam 1 based on the power of the wanted signal, the interference, and the noise of the beam 1.

The terminal measures a power of a wanted signal of the beam 2 based on the CSI-RS #2, and measures an interference and a noise of the beam 2 based on the CSI-RS #6. The terminal determines an L1-SINR of the beam 2 based on the power of the wanted signal, the interference, and the noise of the beam 2.

The terminal measures a power of a wanted signal of the beam 3 based on the CSI-RS #3, and measures an interference and a noise of the beam 3 based on the CSI-RS #7. The terminal determines an L1-SINR of the beam 3 based on the power of the wanted signal, the interference, and the noise of the beam 3.

The terminal measures a power of a wanted signal of the beam 4 based on the CSI-RS #4, and measures an interference and a noise of the beam 4 based on the CSI-RS #8. The terminal determines an L1-SINR of the beam 4 based on the power of the wanted signal, the interference, and the noise of the beam 4.

In the second CSI-RS periodicity:

The terminal measures a power of a wanted signal of the beam 5 based on the CSI-RS #1, and measures an interference and a noise of the beam 5 based on the CSI-RS #5. The terminal determines an L1-SINR of the beam 5 based on the power of the wanted signal, the interference, and the noise of the beam 5.

The terminal measures a power of a wanted signal of the beam 6 based on the CSI-RS #2, and measures an interference and a noise of the beam 62 based on the CSI-RS #6. The terminal determines an L1-SINR of the beam 6 based on the power of the wanted signal, the interference, and the noise of the beam 6.

The terminal measures a power of a wanted signal of the beam 7 based on the CSI-RS #3, and measures an interference and a noise of the beam 7 based on the CSI-RS #7. The terminal determines an L1-SINR of the beam 7 based on the power of the wanted signal, the interference, and the noise of the beam 7.

The terminal measures a power of a wanted signal of the beam 8 based on the CSI-RS #4, and measures an interference and a noise of the beam 8 based on the CSI-RS #8. The terminal determines an L1-SINR of the beam 8 based on the power of the wanted signal, the interference, and the noise of the beam 8.

The terminal selects an optimal receive beam from the eight beams (the beam 1 to the beam 8) based on the L1-SINRs of the beam 1 to the beam 8. The terminal selects one or more L1-SINRs from the eight L1-SINRs, and reports the one or more L1-SINRs to the network device.

In the manner 2, with reference to the foregoing example, the terminal may determine, in the two CSI-RS resource periodicities, the optimal receive beam corresponding to the first CSI-RS resource set. The value of the first parameter is 2. Based on this, if the terminal determines that a value of a quantity M of samples in one beam measurement periodicity is 3 and a value of P is 2, the terminal determines that one beam measurement periodicity is 3×2×2=12 CSI-RS periodicities.

In a possible implementation, as shown in FIG. 3, FIG. 5, or FIG. 6, after S205, the method further includes S206.

S206: The terminal sends first indication information to the network device. Correspondingly, the network device receives the first indication information from the terminal. The first indication information indicates the optimal receive beam of the terminal.

Based on the foregoing technical solutions, according to the method provided in this embodiment of this application, the terminal can complete L1-SINR measurement of the receive beam in the measurement periodicity of the L1-SINR beam measurement based on the CMR resource and the IMR resource, to determine the optimal receive beam of the terminal.

Embodiment 2

Figure 7:
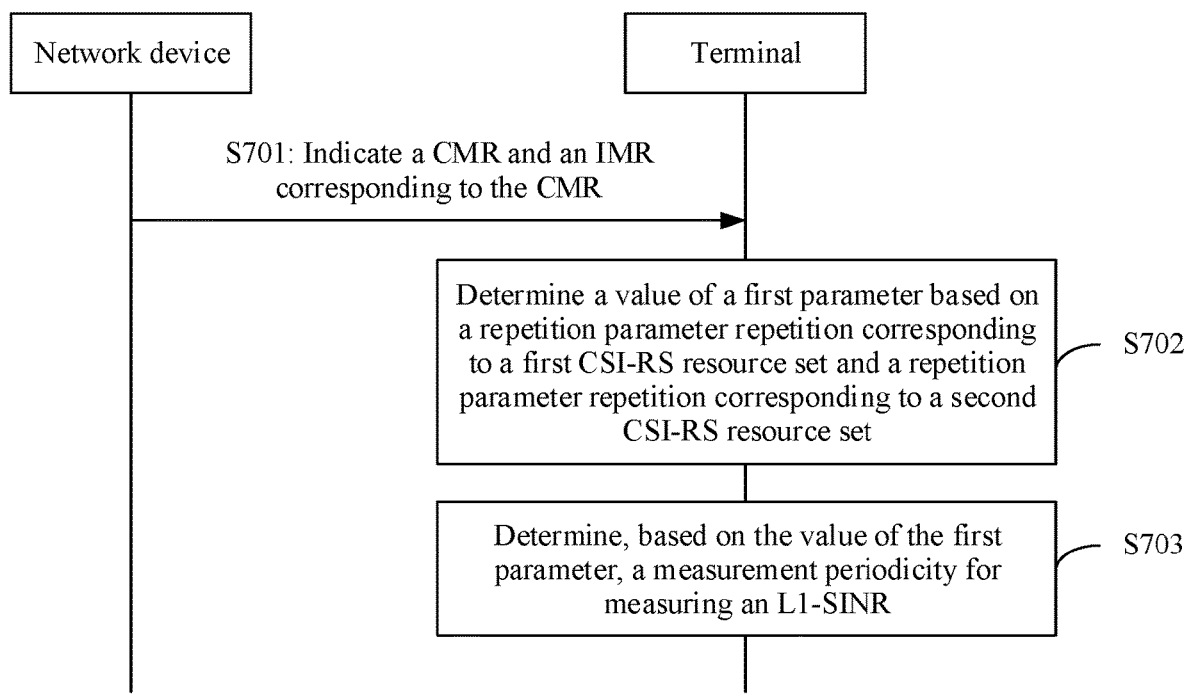
FIG. 7 is a schematic flowchart of another communication method according to an embodiment of this application.

As shown in FIG. 7, a communication method includes S701, S702, and S703.

S701: A network device indicates, to a terminal, a CMR and an IMR corresponding to the CMR. Correspondingly, the terminal receives the CMR and the IMR corresponding to the CMR that are indicated by the network device.

An implementation of S701 is similar to that of S201. For specific implementation of S701, refer to S201. Details are not described herein again.

S702: The terminal determines a value of a first parameter based on a repetition parameter repetition corresponding to a first CSI-RS resource set and a repetition parameter repetition corresponding to a second CSI-RS resource set.

The first parameter is a parameter required for determining a measurement periodicity of L1-SINR beam measurement. In the following descriptions, the repetition parameter repetition is denoted as repetition. A configuration of repetition of the first CSI-RS resource set is the same as a configuration of repetition of the second CSI-RS resource set.

In a possible implementation, if repetition of the first CSI-RS resource set is configured as "off", or repetition of the second CSI-RS resource set is configured as "off", the value of N is 8, or the value of N is R. A value of R is a maximum quantity of receive beams that is reported when the terminal performs capability reporting.

If repetition of the first CSI-RS resource set and repetition of the second CSI-RS resource set are both configured as "on", the value of N is $\lceil R/K \rceil$, or the value of N is $\lceil R/\min(K, L) \rceil$.

min(K, L) indicates that a smaller value in K and L is used, a value of K is a quantity of CSI-RS resources in the first CSI-RS resource set, and a value of L is a quantity of CSI-RS resources in the second CSI-RS resource set.

It should be noted that repetition indicates whether the network device sends the one or more first CSI-RS resources in the first CSI-RS resource set by using a same transmit beam.

For example, if repetition corresponding to the first CSI-RS resource set is set to "on", it indicates that the network device sends the one or more first CSI-RS resources in the first CSI-RS resource set by using a same transmit beam (for example, a transmit beam a).

If repetition corresponding to the first CSI-RS resource set is set to "off", it indicates that the network device may separately send the one or more first CSI-RS resources in the first CSI-RS resource set by using different transmit beams.

A meaning of repetition corresponding to the second CSI-RS resource set is the same as that of repetition corresponding to the first CSI-RS resource set. Details are not described herein again.

S703: The terminal determines, based on the value of the first parameter, the measurement periodicity for measuring an L1-SINR.

In a possible implementation, the terminal determines a value of the measurement periodicity $T_{L1\text{-}SINR}$ of the L1-SINR beam measurement according to the following formula 1:

$$T_{L1\text{-}SINR} = \lceil M \times P \times N \rceil \times T_{CMR\_CSI\text{-}RS} \qquad \text{Formula 1}$$

M is a quantity of samples corresponding to the measurement periodicity of the L1-SINR beam measurement, P is a measurement relaxation factor, N is the first parameter, and $T_{CMR\_CSI\text{-}RS}$ is a periodicity corresponding to the CMR.

For meanings of the parameters M, N, and P, refer to the foregoing descriptions of the parameters M, N, and P in "5.1. SSB-based L1-RSRP beam measurement". Details are not described herein again.

Based on the foregoing technical solution, in Embodiment 2 of this application, the terminal determines the value of the first parameter based on repetition of the first CSI-RS resource set. Therefore, a specific value of the first parameter in a scenario in which the L1-SINR beam measurement is performed based on the CMR and the IMR is specified. In this way, the terminal may determine, based on the value of the first parameter, the measurement periodicity for measuring the L1-SINR.

Figure 8:
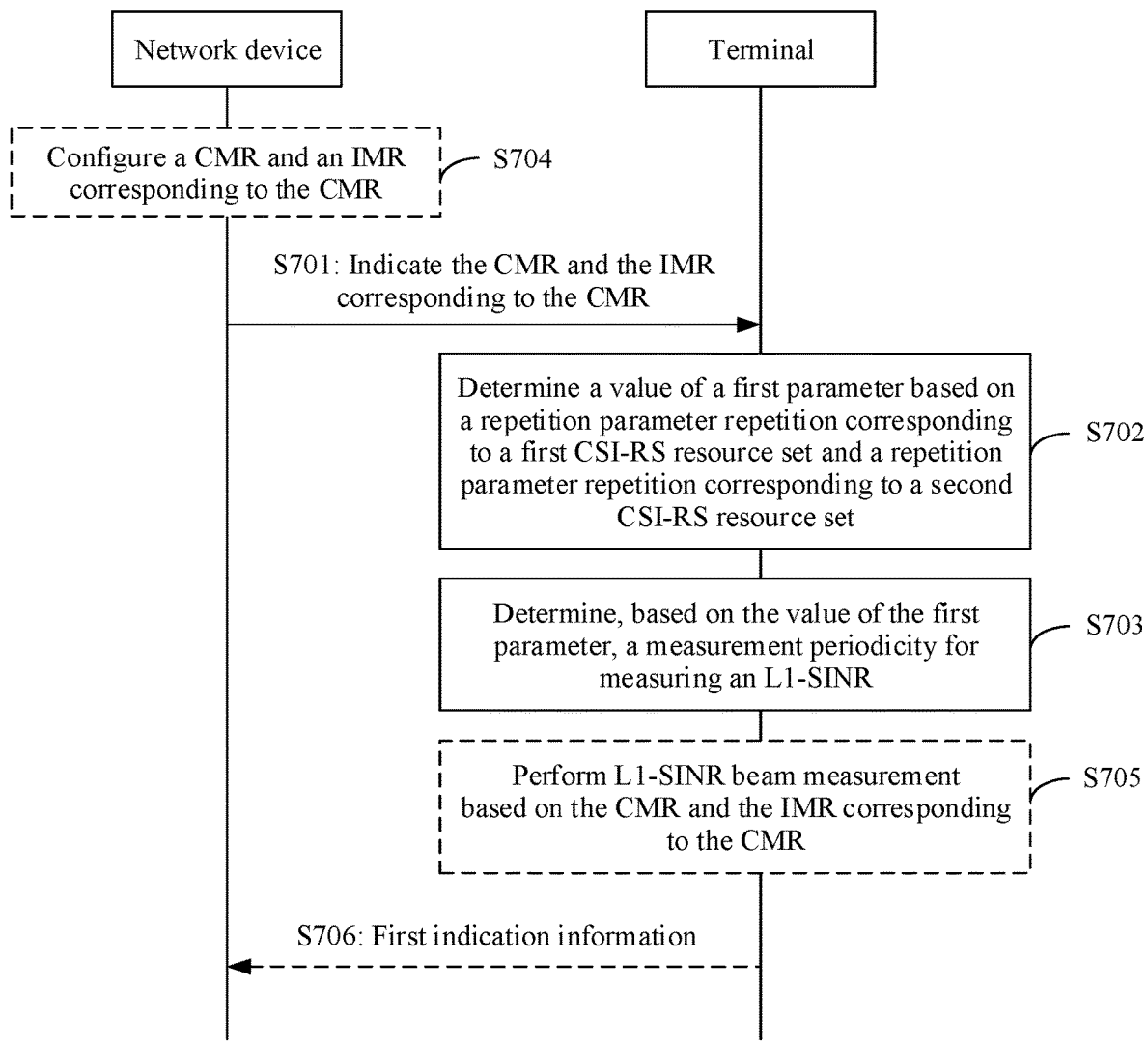
FIG. 8 is a schematic flowchart of another communication method according to an embodiment of this application.

With reference to FIG. 7, as shown in FIG. 8, before S701, the communication method provided in this embodiment of this application further includes S704.

S704: The network device configures the CMR and the IMR corresponding to the CMR.

A specific implementation of S704 is similar to that of S204. Details are not described herein again.

In an implementation of S702, there are two cases for repetition corresponding to the first CSI-RS resource set and repetition corresponding to the second CSI-RS resource set, where the two cases are a case 3 and a case 4. In the case 3, repetition corresponding to the first CSI-RS resource set and repetition corresponding to the second CSI-RS resource set are both set to "off". In the case 4, repetition corresponding to the first CSI-RS resource set and repetition corresponding to the second CSI-RS resource set are both set to "on". The case 3 and the case 4 are described in detail below separately.

Case 3: repetition corresponding to the first CSI-RS resource set and repetition corresponding to the second CSI-RS resource set are both set to "off".

In the case 3, the terminal determines that the value of N is 8, or the value of N is R.

It should be noted that, in the case 3, the network device configures, for each first CSI-RS resource, a measurement resource having a QCL relationship with the first CSI-RS resource. However, the measurement resource may not be a CMR that is used to measure an L1-RSRP or the L1-SINR. The measurement resource may indicate only broad beam information (for example, a receive beam direction). Similarly, the network device configures, for each second CSI-RS resource, a measurement resource having a QCL relationship with the second CSI-RS resource.

In this case, the terminal configures a plurality of beams for each pair of a first CSI-RS resource and a second CSI-RS resource. The plurality of beams are determined by the terminal based on beam information indicated by a measurement resource that has a QCL relationship with the first CSI-RS resource and a measurement resource that has a QCL relationship with the second CSI-RS resource. A quantity of receive beams selected by the terminal is less than or equal to R, in other words, less than or equal to the maximum quantity of receive beams that is reported when the terminal performs capability reporting.

The terminal measures, in each CSI-RS resource periodicity, one of the plurality of beams configured for each pair of a first CSI-RS resource and a second CSI-RS resource.

In this way, the terminal requires a maximum of R periodicities to determine L1-SINRs of the receive beams. Based on this, the terminal determines that the value of N is R. A maximum value of R is 8. When the value of R is set to 8, the value of N is 8.

Case 4: repetition corresponding to the first CSI-RS resource set and repetition corresponding to the second CSI-RS resource set are both set to "on".

In the case 4, the terminal determines that the value of the first parameter is ⌈R/K⌉, or the value of the first parameter is ⌈R/min(K, L)⌉.

The case 4 is similar to the case 2. For specific implementation of the case 4, refer to the case 2. Details are not described herein again.

With reference to FIG. 7, as shown in FIG. 8, after S703, the method provided in this embodiment of this application further includes S705.

S705: The terminal performs L1-SINR beam measurement based on the CMR and the IMR corresponding to the CMR.

A manner in which the terminal performs L1-SINR beam measurement is related to a setting of repetition corresponding to the first CSI-RS resource set and a setting of repetition corresponding to the second CSI-RS resource set.

When repetition corresponding to the first CSI-RS resource set and repetition corresponding to the second CSI-RS resource set are both set to "off", the terminal performs L1-SINR beam measurement in a manner 3.

When repetition corresponding to the first CSI-RS resource set and repetition corresponding to the second CSI-RS resource set are both set to "on", the terminal performs L1-SINR beam measurement in a manner 4.

The manner 3 corresponds to the case 3, and the manner 4 corresponds to the case 4. The manner 3 and the manner 4 are described in detail below.

Manner 3

Figure 9:
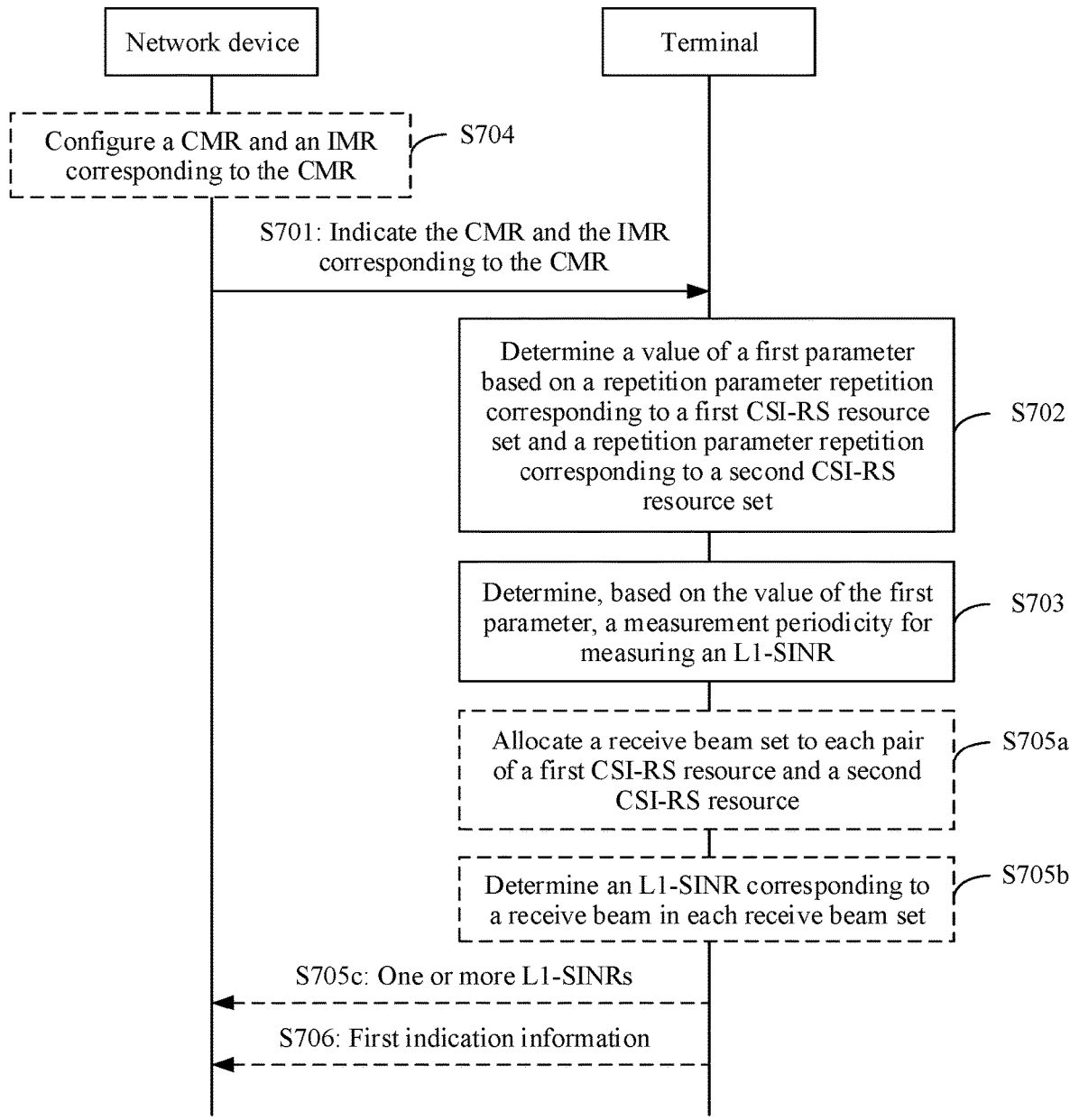
FIG. 9 is a schematic flowchart of another communication method according to an embodiment of this application.

With reference to FIG. 7, as shown in FIG. 9, when repetition corresponding to the first CSI-RS resource set or repetition corresponding to the second CSI-RS resource set is set to "off", the terminal performs the following S705a, S705b, and S705c.

S705a: The terminal allocates a receive beam set to each pair of a first CSI-RS resource and a second CSI-RS resource.

Each receive beam set includes a maximum of R receive beams, and a receive beam in the receive beam set is a receive beam determined by the terminal based on beam information indicated by a measurement resource that has a QCL relationship with a first CSI-RS resource and a measurement resource that has a QCL relationship with a second CSI-RS resource.

In this embodiment, a first CSI-RS resource and a second CSI-RS resource that have a correspondence are referred to as a pair of the first CSI-RS resource and the second CSI-RS resource.

S705b: The terminal determines an L1-SINR corresponding to the receive beam in each receive beam set.

In a possible implementation, the terminal measures, by using the first CSI-RS resource, a power of a wanted signal of the receive beam in the receive beam set allocated to the first CSI-RS resource, and measures, based on the second CSI-RS resource, an interference and a noise of the receive beam in the receive beam set allocated to the second CSI-RS resource. The terminal determines the L1-SINR of the receive beam based on the power of the wanted signal, the interference, and the noise of the receive beam.

Based on the foregoing manner, the terminal determines an L1-SINR of each receive beam in each receive beam set.

S705c: The terminal reports one or more L1-SINRs to the network device.

The one or more L1-SINRs reported by the terminal to the network device are one or more L1-SINRs with larger values in L1-SINRs determined in S705b. A quantity of L1-SINRs reported by the terminal to the network device may be determined based on a quantity of L1-SINRs that need to be reported as indicated by the network device. For example, if the network device indicates that the terminal needs to report three L1-SINRs, the terminal reports, to the network device, three L1-SINRs with larger values in the L1-SINRs determined in S705b.

In an example, with reference to FIG. 4 and the foregoing case 3, a process in which the terminal performs L1-SINR beam measurement in the manner 3 is described as follows:

Receive beams in a receive beam set corresponding to a CSI-RS #1 and a CSI-RS #5 are separately a beam 1, a beam 2, a beam 3, a beam 4, a beam 5, a beam 6, a beam 7, and a beam 8.

Receive beams in a receive beam set corresponding to a CSI-RS #2 and a CSI-RS #5 are separately a beam 9, a beam 10, a beam 11, a beam 12, a beam 13, a beam 14, a beam 15, and a beam 16.

Receive beams in a receive beam set corresponding to a CSI-RS #3 and a CSI-RS #7 are separately a beam 17, a beam 18, a beam 19, a beam 20, a beam 21, a beam 22, a beam 23, and a beam 24.

Receive beams in a receive beam set corresponding to a CSI-RS #4 and a CSI-RS #8 are separately a beam 25, a beam 26, a beam 27, a beam 28, a beam 29, a beam 30, a beam 31, and a beam 32.

In the first CSI-RS periodicity: The terminal determines an L1-SINR of the beam 1 based on the CSI-RS #1 and the CSI-RS #5.

The terminal determines an L1-SINR of the beam 9 based on the CSI-RS #2 and the CSI-RS #6.

The terminal determines an L1-SINR of the beam 17 based on the CSI-RS #3 and the CSI-RS #7.

The terminal determines an L1-SINR of the beam 25 based on the CSI-RS #4 and the CSI-RS #8.

In the second CSI-RS periodicity: The terminal determines an L1-SINR of the beam 2 based on the CSI-RS #1 and the CSI-RS #5.

The terminal determines an L1-SINR of the beam 10 based on the CSI-RS #2 and the CSI-RS #6.

The terminal determines an L1-SINR of the beam 18 based on the CSI-RS #3 and the CSI-RS #7.

The terminal determines an L1-SINR of the beam 26 based on the CSI-RS #4 and the CSI-RS #8.

In the third CSI-RS periodicity: The terminal determines an L1-SINR of the beam 3 based on the CSI-RS #1 and the CSI-RS #5.

The terminal determines an L1-SINR of the beam 11 based on the CSI-RS #2 and the CSI-RS #6.

The terminal determines an L1-SINR of the beam 19 based on the CSI-RS #3 and the CSI-RS #7.

The terminal determines an L1-SINR of the beam 27 based on the CSI-RS #4 and the CSI-RS #8.

In the fourth CSI-RS periodicity: The terminal determines an L1-SINR of the beam 4 based on the CSI-RS #1 and the CSI-RS #5.

The terminal determines an L1-SINR of the beam 12 based on the CSI-RS #2 and the CSI-RS #6.

The terminal determines an L1-SINR of the beam 20 based on the CSI-RS #3 and the CSI-RS #7.

The terminal determines an L1-SINR of the beam 28 based on the CSI-RS #4 and the CSI-RS #8.

In the fifth CSI-RS periodicity: The terminal determines an L1-SINR of the beam 5 based on the CSI-RS #1 and the CSI-RS #5.

The terminal determines an L1-SINR of the beam 13 based on the CSI-RS #2 and the CSI-RS #6.

The terminal determines an L1-SINR of the beam 21 based on the CSI-RS #3 and the CSI-RS #7.

The terminal determines an L1-SINR of the beam 29 based on the CSI-RS #4 and the CSI-RS #8.

In the sixth CSI-RS periodicity: The terminal determines an L1-SINR of the beam 6 based on the CSI-RS #1 and the CSI-RS #5.

The terminal determines an L1-SINR of the beam 14 based on the CSI-RS #2 and the CSI-RS #6.

The terminal determines an L1-SINR of the beam 22 based on the CSI-RS #3 and the CSI-RS #7.

The terminal determines an L1-SINR of the beam 30 based on the CSI-RS #4 and the CSI-RS #8.

In the seventh CSI-RS periodicity: The terminal determines an L1-SINR of the beam 7 based on the CSI-RS #1 and the CSI-RS #5.

The terminal determines an L1-SINR of the beam 15 based on the CSI-RS #2 and the CSI-RS #6.

The terminal determines an L1-SINR of the beam 23 based on the CSI-RS #3 and the CSI-RS #7.

The terminal determines an L1-SINR of the beam 31 based on the CSI-RS #4 and the CSI-RS #8.

In the eighth CSI-RS periodicity: The terminal determines an L1-SINR of the beam 8 based on the CSI-RS #1 and the CSI-RS #5.

The terminal determines an L1-SINR of the beam 16 based on the CSI-RS #2 and the CSI-RS #6.

The terminal determines an L1-SINR of the beam 24 based on the CSI-RS #3 and the CSI-RS #7.

The terminal determines an L1-SINR of the beam 32 based on the CSI-RS #4 and the CSI-RS #8.

Then, the terminal determines a largest L1-SINR corresponding to each pair of a first CSI-RS resource and a second CSI-RS resource (four L1-SINRs in total). The terminal determines receive beams corresponding to the four L1-SINRs as corresponding optimal receive beams. The terminal further determines, based on the four L1-SINRs, one or more L1-SINRs used for reporting.

In the manner 3, with reference to the foregoing example, the terminal may determine, in the eight CSI-RS resource periodicities, an optimal receive beam corresponding to the terminal. The value of the first parameter is 8. Based on this, if the terminal determines that a value of a quantity M of samples in one beam measurement periodicity is 3 and a value of P is 2, the terminal determines that one beam measurement periodicity is 3×8×2=48 CSI-RS periodicities.

Based on the foregoing technical solution, the terminal determines, by determining the receive beam set corresponding to each pair of a first CSI-RS resource and a second CSI-RS resource, an optimal receive beam corresponding to the first CSI-RS resource and the second CSI-RS resource. This can ensure that the optimal receive beam finally determined by the terminal is a beam with a best L1-SINR.

Manner 4

Figure 10:
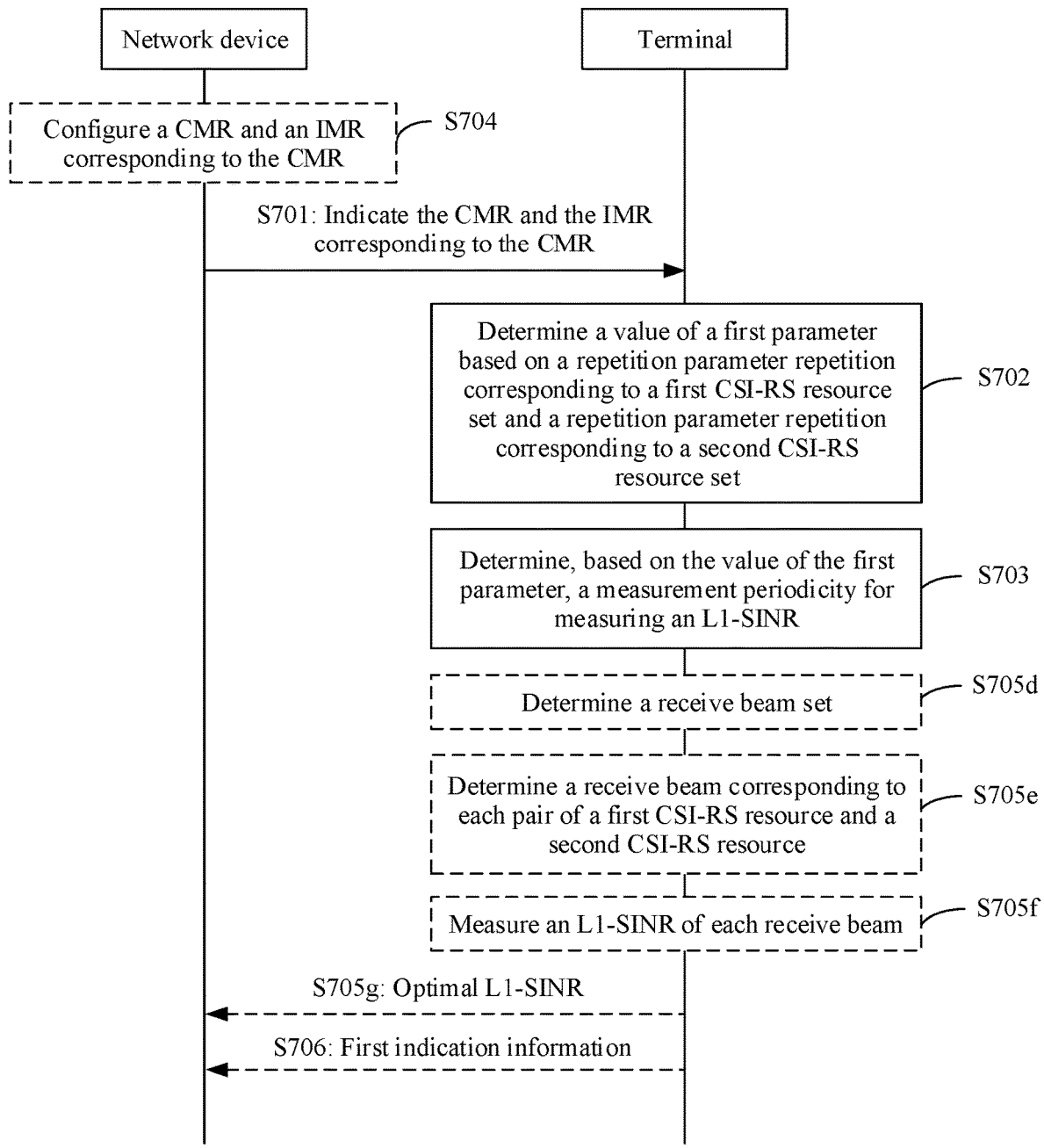
FIG. 10 is a schematic flowchart of another communication method according to an embodiment of this application.

With reference to FIG. 7, as shown in FIG. 10, when repetition of the first CSI-RS resource set and repetition of the second CSI-RS resource set are both set to "on", the terminal performs the following S705d, S705e, S705f, and S705g.

S705d: The terminal determines a receive beam set.

An implementation of S705d is similar to that of S205f. For specific implementation of S705d, refer to S205f. Details are not described herein again.

S705e: The terminal determines a receive beam corresponding to each pair of a first CSI-RS resource and a second CSI-RS resource.

An implementation of S705e is similar to that of S205g. For specific implementation of S705e, refer to S205g. Details are not described herein again.

S705f: The terminal measures an L1-SINR of each receive beam.

An implementation of S705f is similar to that of S205h. For specific implementation of S705f, refer to S205h. Details are not described herein again.

S705g: The terminal reports an optimal L1-SINR to the network device.

An implementation of S705g is similar to that of S205i. For specific implementation of S705g, refer to S205i. Details are not described herein again.

It should be noted that an overall implementation of the manner 4 is similar to that of the manner 2. For specific implementation of the manner 4, refer to the manner 2. Details are not described herein again.

In a possible implementation, as shown in FIG. 8, FIG. 9, or FIG. 10, after S705, the method further includes S706.

S706: The terminal sends first indication information to the network device. Correspondingly, the network device receives the first indication information from the terminal. The first indication information indicates an optimal receive beam of the terminal.

Based on the foregoing technical solutions, according to the method provided in this embodiment of this application, the terminal can complete L1-SINR measurement of the receive beam in the measurement periodicity of the L1-SINR beam measurement based on the CMR resource and the IMR resource, to determine the optimal receive beam of the terminal.

The foregoing describes the communication methods provided in embodiments of this application, and the following describes a terminal and a network device provided in embodiments of this application.

Figure 11:
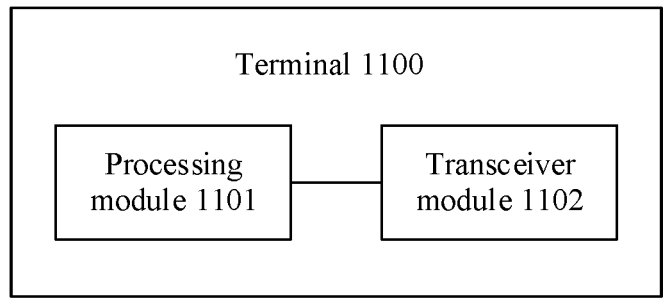
FIG. 11 is a schematic diagram of a structure of a terminal according to an embodiment of this application.

FIG. 11 is a schematic block diagram of a terminal 1100 according to an embodiment of this application. The terminal 1100 includes a processing module 1101 and a transceiver module 1102.

The transceiver module 1102 is configured to receive a CMR and an IMR corresponding to the CMR that are indicated by a network device, where the CMR and the IMR are used to measure an L1-SINR, an L1-SINR beam measurement result is used for beam management, the CMR includes one or more CSI-RS resources in a first CSI-RS resource set, the IMR includes one or more CSI-RS resources in a second CSI-RS resource set, and the first CSI-RS resource set and the second CSI-RS resource set are different CSI-RS resource sets.

The processing module 1101 is configured to determine a value of a first parameter based on a repetition parameter repetition corresponding to the first CSI-RS resource set.

The processing module 1101 is further configured to determine, based on the value of the first parameter, a measurement periodicity for measuring the L1-SINR.

In a possible implementation, if the repetition parameter repetition of the first CSI-RS resource set is configured as "on", the value of the first parameter is $\lceil R/K \rceil$, or the value of the first parameter is $\lceil R/\min(K, L) \rceil$. In a possible implementation, if the repetition parameter repetition of the first CSI-RS resource set is configured as "off", the value of the first parameter is 1.

In a possible implementation, a configuration of a repetition parameter repetition of the IMR is consistent with a configuration of a repetition parameter repetition of the CMR.

In a possible implementation, the processing module 1101 is configured to determine a value of the measurement periodicity $T_{L1\text{-}SINR}$ of L1-SINR beam measurement according to the following formula:

$$T_{L1\text{-}SINR} = \lceil M \times P \times N \rceil \times T_{CMR\_CSI\text{-}RS}$$

M is a quantity of samples corresponding to the measurement periodicity of the L1-SINR beam measurement, P is a measurement relaxation factor, N is the first parameter, and $T_{CMR\_CSI\text{-}RS}$ is a periodicity corresponding to the CMR.

In a possible implementation, if the repetition parameter repetition of the first CSI-RS resource set is configured as "off", each CSI-RS resource in the first CSI-RS resource set has a corresponding measurement resource, and the CSI-RS resource and the corresponding measurement resource have a quasi co-location QCL-type TypeD relationship.

In a possible implementation, the measurement resource is an SSB, and the SSB is a CMR that can be used to measure the L1-SINR, or the SSB is a CMR that can be used to measure an L1-RSRP.

In a possible implementation, the measurement resource is a CSI-RS resource in a third CSI-RS resource set, a repetition parameter repetition of the third CSI-RS resource set is configured as "on", and the first CSI-RS resource set, the second CSI-RS resource set, and the third CSI-RS resource set are different from each other.

In a possible implementation, the CSI-RS resource in the third CSI-RS resource set is a CMR that can be used to measure the L1-SINR, or the CSI-RS resource in the third CSI-RS resource set is a CMR that can be used to measure an L1-RSRP.

Figure 12:
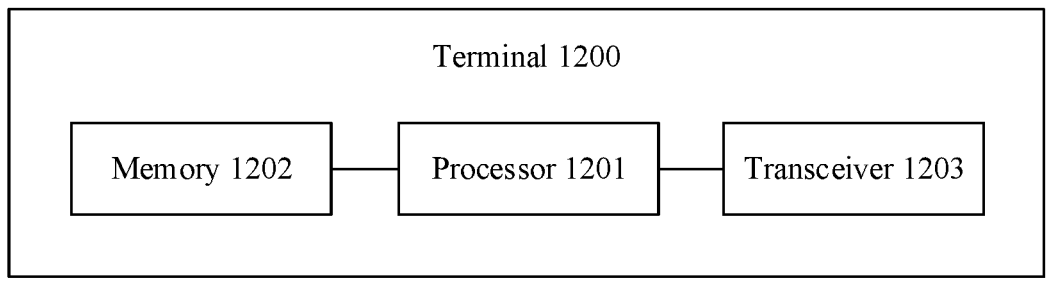
FIG. 12 is a schematic diagram of a structure of another terminal according to an embodiment of this application.

As shown in FIG. 12, an embodiment of this application further provides a terminal 1200. The terminal 1200 includes a processor 1201, a memory 1202, and a transceiver 1203. The memory 1202 stores instructions or a program, and the processor 1201 is configured to execute the instructions or the program stored in the memory 1202. When the instructions or the program stored in the memory 1202 is executed, the processor 1201 is configured to perform an operation performed by the processing module 1101 in the foregoing embodiment, and the transceiver 1203 is configured to perform an operation performed by the transceiver module 1102 in the foregoing embodiment.

It should be understood that, the terminal 1100 or the terminal 1200 in embodiments of this application may correspond to the terminal in FIG. 2, FIG. 3, FIG. 5, or FIG. 6 in embodiments of this application, and the operations and/or functions of the modules of the terminal 1100 or the terminal 1200 are intended to separately implement corresponding procedures of the method in FIG. 2, FIG. 3, FIG. 5, or FIG. 6. For brevity, details are not described herein again.

Figure 13:
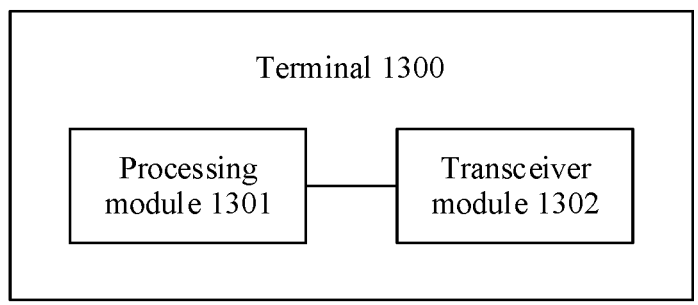
FIG. 13 is a schematic diagram of a structure of another terminal according to an embodiment of this application.

FIG. 13 is a schematic block diagram of a terminal 1300 according to an embodiment of this application. The terminal 1300 includes a processing module 1301 and a transceiver module 1302.

The transceiver module 1302 is configured to receive a CMR and an IMR corresponding to the CMR that are indicated by a network device, where the CMR and the IMR are used to measure an L1-SINR, an L1-SINR beam measurement result is used for beam management, the CMR includes one or more CSI-RS resources in a first CSI-RS resource set, the IMR includes one or more CSI-RS resources in a second CSI-RS resource set, and the first CSI-RS resource set and the second CSI-RS resource set are different CSI-RS resource sets.

The processing module 1301 is configured to determine a value of a first parameter based on a repetition parameter repetition corresponding to the first CSI-RS resource set and a repetition parameter repetition corresponding to the second CSI-RS resource set.

The processing module 1301 is further configured to determine, based on the value of the first parameter, a measurement periodicity for measuring the L1-SINR.

In a possible implementation, if the repetition parameter repetition of the first CSI-RS resource set and the repetition parameter repetition of the second CSI-RS resource set are both configured as "on", the value of N is ⌈R/K⌉, or the value of N is ⌈R/min(K, L)⌉.

A value of R is a maximum quantity of receive beams that is reported when the terminal performs capability reporting, min(K, L) indicates that a smaller value in K and L is used, a value of K is a quantity of CSI-RS resources in the first CSI-RS resource set, and a value of L is a quantity of CSI-RS resources in the second CSI-RS resource set.

In a possible implementation, if the repetition parameter repetition of the first CSI-RS resource set is configured as "off", or the repetition parameter repetition of the second CSI-RS resource set is configured as "off", the value of N is 8, or the value of N is R. A value of R is a maximum quantity of receive beams that is reported when the terminal performs capability reporting.

In a possible implementation, a configuration of a repetition parameter repetition of the IMR is consistent with a configuration of a repetition parameter repetition of the CMR.

In a possible implementation, the processing module 1301 is further configured to determine a value of the measurement periodicity $T_{L1\text{-}SINR}$ of L1-SINR beam measurement according to the following formula:

$$T_{L1\text{-}SINR} = \lceil M \lambda P \times N \rceil \times T_{CMR\_CSI\text{-}RS}$$

M is a quantity of samples corresponding to the measurement periodicity of the L1-SINR beam measurement, P is a measurement relaxation factor, N is the first parameter, and $T_{CMR\_CSI\text{-}RS}$ is a periodicity corresponding to the CMR.

In a possible implementation, if the repetition parameter repetition of the first CSI-RS resource set is configured as "off", each CSI-RS resource in the first CSI-RS resource set has a corresponding measurement resource, and the CSI-RS resource and the corresponding measurement resource have a quasi co-location QCL-type TypeD relationship.

In a possible implementation, the measurement resource is an SSB, and the SSB is a CMR that can be used to measure the L1-SINR, or the SSB is a CMR that can be used to measure an L1-RSRP.

In a possible implementation, the measurement resource is a CSI-RS resource in a third CSI-RS resource set, a repetition parameter repetition of the third CSI-RS resource set is configured as "on", and the first CSI-RS resource set, the second CSI-RS resource set, and the third CSI-RS resource set are different from each other.

In a possible implementation, the CSI-RS resource in the third CSI-RS resource set is a CMR that can be used to measure the L1-SINR, or the CSI-RS resource in the third CSI-RS resource set is a CMR that can be used to measure an L1-RSRP.

Figure 14:
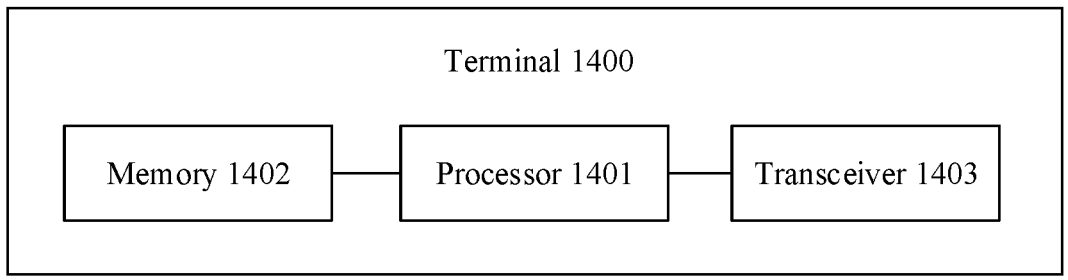
FIG. 14 is a schematic diagram of a structure of another terminal according to an embodiment of this application.

As shown in FIG. 14, an embodiment of this application further provides a terminal 1400. The terminal 1400 includes a processor 1401, a memory 1402, and a transceiver 1403. The memory 1402 stores instructions or a program, and the processor 1401 is configured to execute the instructions or the program stored in the memory 1402. When the instructions or the program stored in the memory 1402 is executed, the processor 1401 is configured to perform an operation performed by the processing module 1301 in the foregoing embodiment, and the transceiver 1403 is configured to perform an operation performed by the transceiver module 1302 in the foregoing embodiment.

It should be understood that, the terminal 1300 or the terminal 1400 in embodiments of this application may correspond to the terminal in FIG. 7 to FIG. 10 in embodiments of this application, and the operations and/or functions of the modules of the terminal 1300 or the terminal 1400 are intended to separately implement corresponding procedures of the method in FIG. 7 to FIG. 10. For brevity, details are not described herein again.

An embodiment of this application further provides a computer-readable storage medium. The computer-readable storage medium stores a computer program. When the program is executed by a processor, a procedure related to the terminal in FIG. 2, FIG. 3, FIG. 5, or FIG. 6 in the foregoing method embodiment may be implemented.

An embodiment of this application further provides a computer-readable storage medium. The computer-readable storage medium stores a computer program. When the program is executed by a processor, a procedure related to the terminal in FIG. 7 to FIG. 10 in the foregoing method embodiment may be implemented.

An embodiment of this application further provides a communication apparatus. The communication apparatus may be a terminal or a circuit. The communication apparatus may be configured to perform actions performed by the terminal in the foregoing method embodiment.

Figure 15:
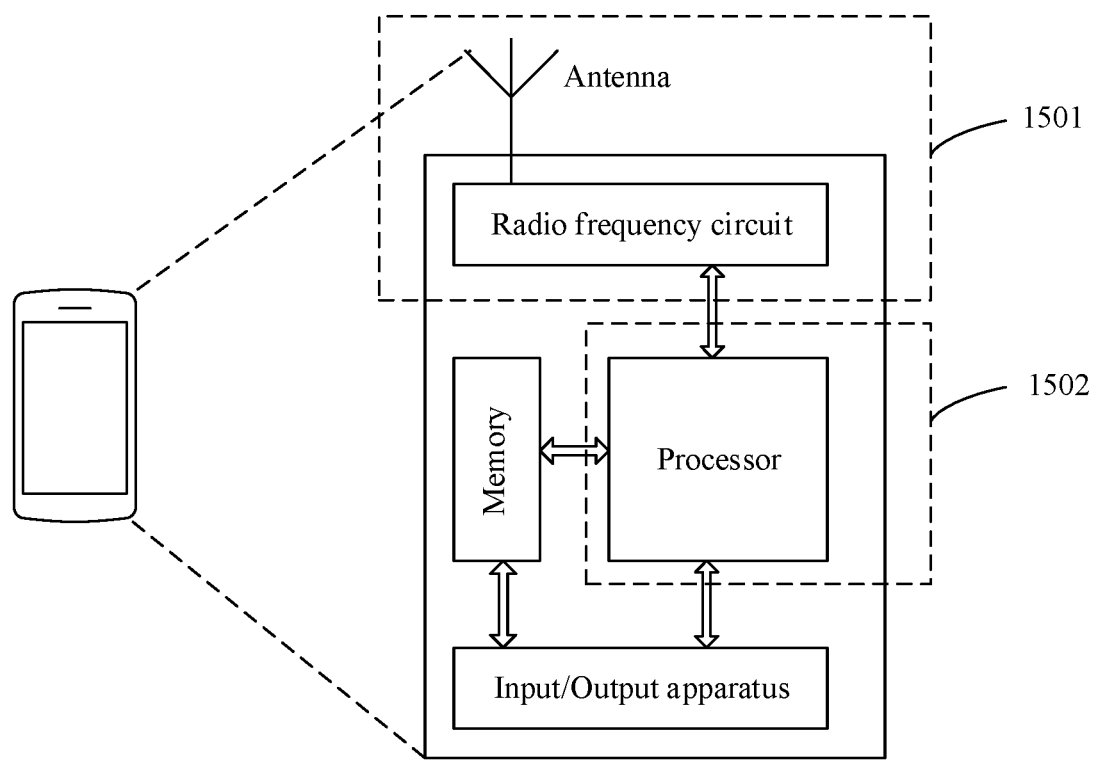
FIG. 15 is a schematic diagram of a hardware structure of a terminal according to an embodiment of this application.

When the communication apparatus is a terminal, FIG. 15 is a simplified schematic diagram of a structure of the terminal. For ease of understanding and convenience of figure illustration, an example in which the terminal is a mobile phone is used in FIG. 15. As shown in FIG. 15, the terminal includes a processor, a memory, a radio frequency circuit, an antenna, and an input/output apparatus. The processor is mainly configured to: process a communication protocol and communication data, control the terminal, execute a software program, process data of the software program, and so on. The memory is mainly configured to store the software program and data. The radio frequency circuit is mainly configured to: perform conversion between a baseband signal and a radio frequency signal, and process the radio frequency signal. The antenna is mainly configured to receive and send radio frequency signals in a form of an electromagnetic wave. The input/output apparatus, for example, a touchscreen, a display, or a keyboard, is mainly configured to: receive data input by a user and output data to the user. It should be noted that some types of terminals may have no input/output apparatus.

When data are to be sent, the processor performs baseband processing on the to-be-sent data, and outputs a baseband signal to the radio frequency circuit. After performing radio frequency processing on the baseband signal, the radio frequency circuit sends a radio frequency signal in a form of an electromagnetic wave through the antenna. When data is sent to the terminal, the radio frequency circuit receives a radio frequency signal through the antenna, converts the radio frequency signal into a baseband signal, and outputs the baseband signal to the processor. The processor converts the baseband signal into data, and processes the data. For ease of description, FIG. 15 shows only one memory and only one processor. In an actual terminal product, there may be one or more processors and one or more memories. The memory may also be referred to as a storage medium, a storage device, or the like. The memory may be disposed independent of the processor, or may be integrated with the processor. This is not limited in this embodiment of this application.

In this embodiment of this application, the antenna having receiving and sending functions and the radio frequency circuit may be considered as a transceiver unit of the terminal, and the processor having a processing function is considered as a processing unit of the terminal. As shown in FIG. 15, the terminal includes the transceiver unit 1501 and the processing unit 1502. The transceiver unit may also be referred to as a transceiver, a transceiver machine, a transceiver apparatus, or the like. The processing unit may also be referred to as a processor, a processing board, a processing module, a processing apparatus, or the like. Optionally, a component that is in the transceiver unit 1501 and that is configured to implement a receiving function may be considered as a receiving unit, and a component that is in the transceiver unit 1501 and that is configured to implement a sending function may be considered as a sending unit. In other words, the transceiver unit 1501 includes the receiving unit and the sending unit. The transceiver unit sometimes may also be referred to as a transceiver machine, a transceiver, a transceiver circuit, or the like. The receiving unit sometimes may also be referred to as a receiver machine, a receiver, a receive circuit, or the like. The sending unit sometimes may also be referred to as a transmitter machine, a transmitter, a transmit circuit, or the like.

It should be understood that the transceiver unit 1501 is configured to perform a sending operation and a receiving operation on a terminal side in the foregoing method embodiment, and the processing unit 1502 is configured to perform an operation other than the receiving and sending operations of the terminal in the foregoing method embodiment.

For example, in an implementation, the transceiver unit 1501 is configured to perform a sending operation on the terminal side in S201 in FIG. 2, and/or the transceiver unit 1501 is further configured to perform other receiving and sending steps on the terminal side in embodiments of this application. The processing unit 1502 is configured to perform S202 and S203 in FIG. 2, and/or the processing unit 1502 is further configured to perform another processing step on the terminal side in embodiments of this application.

For another example, in an implementation, the transceiver unit 1501 is configured to perform sending operations on the terminal side in S201 and S206 in FIG. 3, and/or the transceiver unit 1501 is further configured to perform other receiving and sending steps on the terminal side in embodiments of this application. The processing unit 1502 is configured to perform S202, S203, and S205 in FIG. 2, and/or the processing unit 1502 is further configured to perform another processing step on the terminal side in embodiments of this application.

For still another example, in an implementation, the transceiver unit 1501 is configured to perform sending operations on the terminal side in S201, S205*i*, and S206 in FIG. 5, and/or the transceiver unit 1501 is further configured to perform other receiving and sending steps on the terminal side in embodiments of this application. The processing unit 1502 is configured to perform S202, S203, and S205*a* to S205*e* in FIG. 2, and/or the processing unit 1502 is further configured to perform another processing step on the terminal side in embodiments of this application.

For still another example, in an implementation, the transceiver unit 1501 is configured to perform sending operations on the terminal side in S201, S205*i*, and S206 in FIG. 6, and/or the transceiver unit 1501 is further configured to perform other receiving and sending steps on the terminal side in embodiments of this application. The processing unit 1502 is configured to perform S202, S203, and S205*f* to S205*h* in FIG. 2, and/or the processing unit 1502 is further configured to perform another processing step on the terminal side in embodiments of this application.

For still another example, in an implementation, the transceiver unit 1501 is configured to perform a sending operation on the terminal side in S701 in FIG. 7, and/or the transceiver unit 1501 is further configured to perform other receiving and sending steps on the terminal side in embodiments of this application. The processing unit 1502 is configured to perform S702 and S703 in FIG. 7, and/or the processing unit 1502 is further configured to perform another processing step on the terminal side in embodiments of this application.

For still another example, in an implementation, the transceiver unit 1501 is configured to perform sending operations on the terminal side in S701 and S706 in FIG. 7, and/or the transceiver unit 1501 is further configured to perform other receiving and sending steps on the terminal side in embodiments of this application. The processing unit 1502 is configured to perform S702, S703, and S705 in FIG. 7, and/or the processing unit 1502 is further configured to perform another processing step on the terminal side in embodiments of this application.

For still another example, in an implementation, the transceiver unit 1501 is configured to perform sending operations on the terminal side in S701, S705*c*, and S706 in FIG. 7, and/or the transceiver unit 1501 is further configured to perform other receiving and sending steps on the terminal side in embodiments of this application. The processing unit 1502 is configured to perform S702, S703, S705*a*, and S705*b* in FIG. 7, and/or the processing unit 1502 is further configured to perform another processing step on the terminal side in embodiments of this application.

For still another example, in an implementation, the transceiver unit 1501 is configured to perform sending operations on the terminal side in S701, S705*c*, and S706 in FIG. 7, and/or the transceiver unit 1501 is further configured to perform other receiving and sending steps on the terminal side in embodiments of this application. The processing unit 1502 is configured to perform S702, S703, and S705*d* to S705*g* in FIG. 7, and/or the processing unit 1502 is further configured to perform another processing step on the terminal side in embodiments of this application.

When the communication apparatus is a chip apparatus or circuit, the apparatus may include a transceiver unit and a processing unit. The transceiver unit may be an input/output circuit and/or a communication interface. The processing unit is an integrated processor, a microprocessor, or an integrated circuit.

Figure 16:
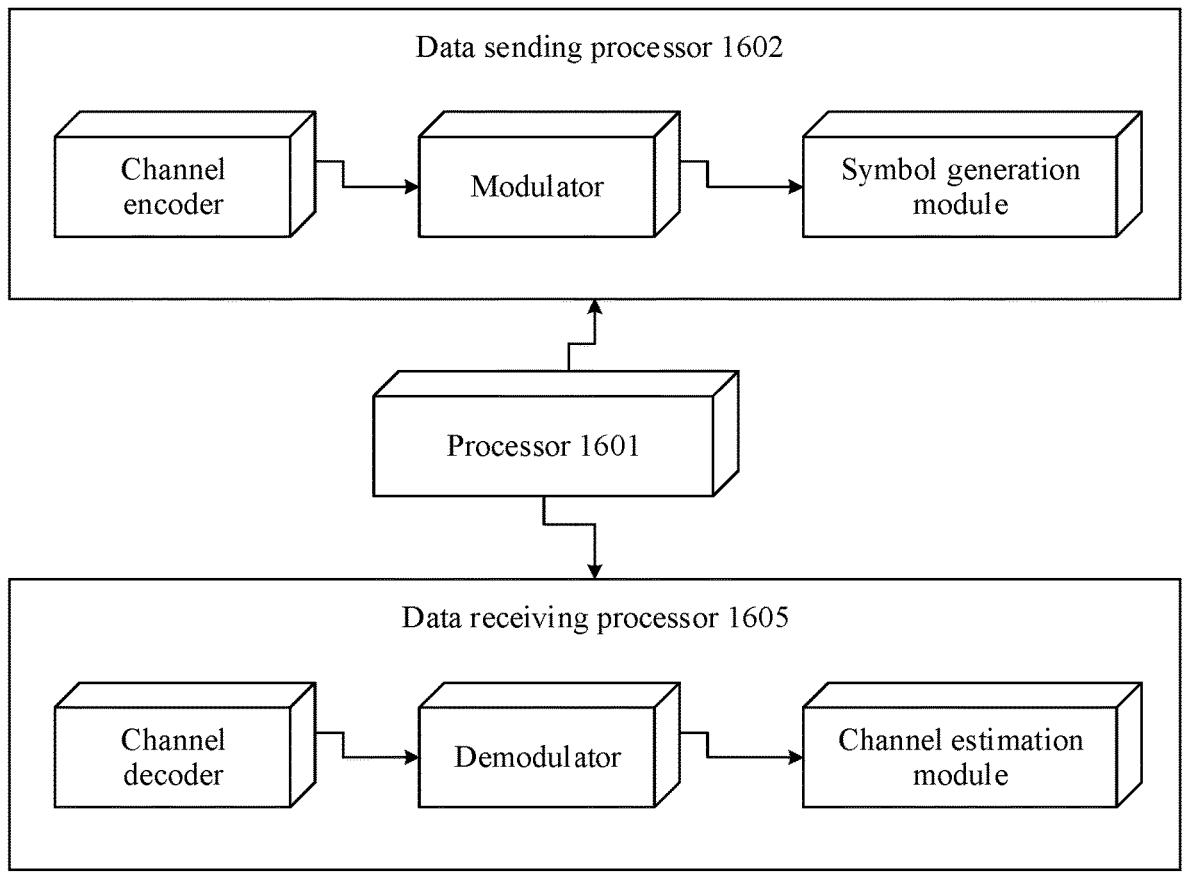
FIG. 16 is a schematic diagram of a structure of a communication apparatus according to an embodiment of this application.

When the communication apparatus in this embodiment is a terminal, reference may be made to a device shown in FIG. 16. In an example, the device may complete a function similar to that of the processor 1201 in FIG. 12, or the device may complete a function similar to that of the processor 1401 in FIG. 14. In FIG. 16, the device includes a processor 1601, a data sending processor 1602, and a data receiving processor 1605. The processing module 1001 in the foregoing embodiment may be the processor 1601 in FIG. 16, and completes a corresponding function. The transceiver module 1002 in the foregoing embodiment may be the data sending processor 1602 and/or the data receiving processor 1605 in FIG. 16. Although a channel encoder and a channel decoder are shown in FIG. 16, it may be understood that the modules are merely an example, and do not constitute a limitation on this embodiment.

Figure 17:
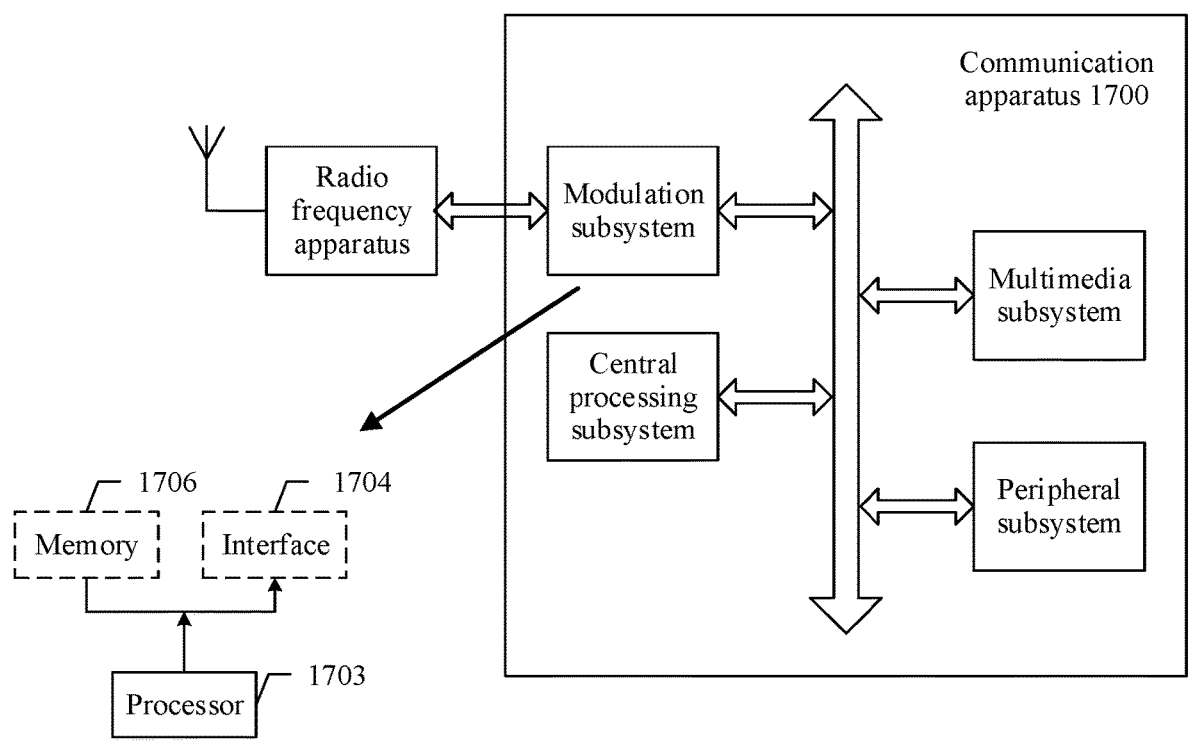
FIG. 17 is a schematic diagram of a structure of another communication apparatus according to an embodiment of this application.

FIG. 17 shows another form of the communication apparatus in this embodiment. The communication apparatus 1700 includes modules such as a modulation subsystem, a central processing subsystem, and a peripheral subsystem. The communication apparatus in this embodiment may be used as the modulation subsystem. Specifically, the modulation subsystem may include a processor 1703 and an interface 1704. The processor 1703 completes a function of the processing module 1101 or a function of the processing module 1301, and the interface 1704 completes a function of the transceiver module 1102 or a function of the transceiver module 1302. In another variation, the modulation subsystem includes a memory 1706, a processor 1703, and a program that is stored in the memory 1706 and that can be run on the processor. When executing the program, the processor 1703 implements the method on the terminal side in the foregoing method embodiment. It should be noted that the memory 1706 may be non-volatile, or may be volatile. The memory 1706 may be located in the modulation subsystem, or may be located in the processing apparatus 1700, provided that the memory 1706 can be connected to the processor 1703.

In another form of this embodiment, a computer-readable storage medium is provided. The computer-readable storage medium stores instructions. When the instructions are executed, the method on the terminal side in the foregoing method embodiment is performed.

In another form of this embodiment, a computer program product including instructions is provided. When the instructions are executed, the method on the terminal side in the foregoing method embodiment is performed.

Figure 18:
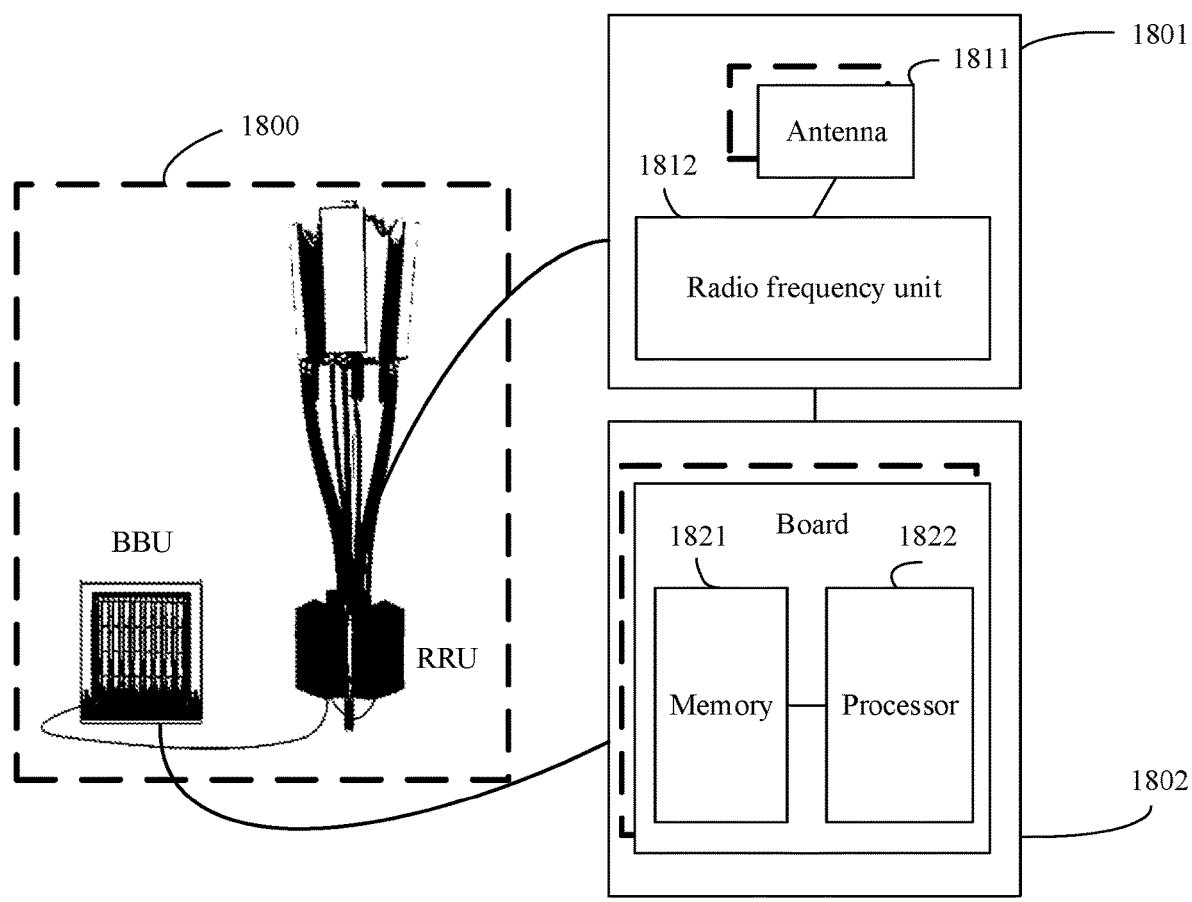
FIG. 18 is a schematic diagram of a hardware structure of a network device according to an embodiment of this application.

When the communication apparatus in this embodiment is a network device, the network device may be shown in FIG. 18. The network device 1800 includes one or more radio frequency units, for example, a remote radio unit (remote radio unit, RRU) 1801, and one or more baseband units (baseband units, BBUs) (which may also be referred to as digital units (digital units, DUs)) 1802. The RRU 1801 may be referred to as a transceiver module. Optionally, the transceiver module may also be referred to as a transceiver machine, a transceiver circuit, a transceiver, or the like, and may include at least one antenna 1811 and a radio frequency unit 1812. The RRU 1801 is mainly configured to: receive and send radio frequency signals, and perform conversion between the radio frequency signal and a baseband signal. For example, the RRU 1801 is configured to send indication information to a terminal. The BBU 1801 is mainly configured to: perform baseband processing, control a base station, and so on. The RRU 1801 and the BBU 1802 may be physically disposed together, or may be physically disposed separately, that is, in a distributed base station.

The BBU 1802 is a control center of the base station, may also be referred to as a processing module, and is mainly configured to implement baseband processing functions such as channel coding, multiplexing, modulation, and spectrum spreading. For example, the BBU (the processing module) may be configured to control the base station to perform an operation procedure related to the network device in the foregoing method embodiment, for example, generate the foregoing indication information.

In an example, the BBU 1802 may include one or more boards. A plurality of boards may jointly support a radio access network (for example, an LTE network) of a single access standard, or may separately support radio access networks (for example, an LTE network, a 5G network, or another network) of different access standards. The BBU 1802 further includes a memory 1821 and a processor 1822. The memory 1821 is configured to store necessary instructions and data. The processor 1822 is configured to control the base station to perform a necessary action, for example, is configured to control the base station to perform an operation procedure related to the network device in the foregoing method embodiment. The memory 1821 and the processor 1822 may serve one or more boards. In other words, a memory and a processor may be independently disposed on each board, or a plurality of boards may share a same memory and a same processor. In addition, a necessary circuit may be further disposed on each board.

It should be understood that, the processor mentioned in embodiments of this application may be a central processing unit (Central Processing Unit, CPU), or may be another general-purpose processor, a digital signal processor (Digital Signal Processor, DSP), an application-specific integrated circuit (Application-Specific Integrated Circuit, ASIC), a field programmable gate array (Field Programmable Gate Array, FPGA) or another programmable logic device, a discrete gate or a transistor logic device, a discrete hardware component, or the like. The general-purpose processor may be a microprocessor, or the processor may be any conventional processor or the like.

It should be further understood that the memory mentioned in embodiments of this application may be a volatile memory or a nonvolatile memory, or may include a volatile memory and a nonvolatile memory. The nonvolatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM), used as an external cache. Through example but not limitative description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DR RAM).

It should be noted that when the processor is the general-purpose processor, the DSP, the ASIC, the FPGA or the another programmable logic device, the discrete gate or the transistor logic device, or the discrete hardware component, the memory (a storage module) is integrated into the processor.

It should be noted that the memory described in this specification aims to include but is not limited to these memories and any memory of another proper type.

It should be further understood that "first", "second", "third", "fourth", and various numbers in this specification are merely used for differentiation for ease of description, and are not intended to limit the scope of this application.

It should be understood that the term "and/or" in this specification describes only an association relationship between associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in embodiments of this application. The execution sequences of the processes should be determined based on functions and internal logic of the processes, and should not be construed as any limitation on the implementation processes of embodiments of this application.

A person of ordinary skill in the art may be aware that, in combination with the units and algorithm steps in the examples described in the embodiments disclosed in this specification, this application can be implemented by using electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiment, and details are not described herein again.

In the several embodiments provided in this application, it should be understood that the disclosed system, apparatus, and method may be implemented in other manners. For example, the described apparatus embodiments are merely examples. For example, division into the units is merely logical function division, and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, that is, may be located at one position, or may be distributed on a plurality of network units. Some or all of the units may be selected based on actual requirements to achieve the objectives of the solutions of embodiments.

In addition, functional units in embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the current technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application. The foregoing storage medium includes any medium that can store program code, such as a USB flash drive, a removable hard disk, a read-only memory (Read-Only Memory, ROM), a random access memory (Random Access Memory, RAM), a magnetic disk, or an optical disc.

In conclusion, the foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A communication method, comprising:
   receiving, by a communication device, a channel measurement resource (CMR) and an interference measurement resource (IMR) corresponding to the CMR, wherein the CMR and the IMR are used to measure a layer 1 signal to interference plus noise ratio (L1-SINR), the CMR comprises one or more channel state information reference signal (CSI-RS) resources in a first CSI-RS resource set, and the IMR comprises one or more CSI-RS resources in a second CSI-RS resource set;
   determining, by the communication device, a value of a first parameter based on a repetition parameter corresponding to the first CSI-RS resource set; and
   determining, by the communication device based on the value of the first parameter, a measurement periodicity for measuring the L1-SINR;
   wherein if the repetition parameter of the first CSI-RS resource set is configured as "on", the value of the first parameter is ⌈R/K⌉, or the value of the first parameter is ⌈R/min(K, L)⌉, wherein
   a value of R is a maximum quantity of receive beams that is reported when the communication device performs capability reporting, min(K, L) indicates that a smaller value in K and L is used, a value of K is a quantity of CSI-RS resources in the first CSI-RS resource set, and a value of L is a quantity of CSI-RS resources in the second CSI-RS resource set.

2. The communication method according to claim 1, wherein if the repetition parameter of the first CSI-RS resource set is configured as "off", the value of the first parameter is 1.

3. The communication method according to claim 1, further comprising: determining, by the communication device, the value of the first parameter based on the repetition parameter corresponding to the first CSI-RS resource set and a repetition parameter corresponding to the second CSI-RS resource set.

4. The communication method according to claim 3, wherein if the repetition parameter of the first CSI-RS resource set and the repetition parameter of the second CSI-RS resource set are both configured as "on", the value of the first parameter is ⌈R/K⌉, or the value of the first parameter is ⌈R/min(K, L)⌉, wherein
   a value of R is a maximum quantity of receive beams that is reported when the communication device performs capability reporting, min(K, L) indicates that a smaller value in K and L is used, a value of K is a quantity of CSI-RS resources in the first CSI-RS resource set, and a value of L is a quantity of CSI-RS resources in the second CSI-RS resource set.

5. The communication method according to claim 3, wherein if the repetition parameter of the first CSI-RS resource set is configured as "off", or the repetition parameter of the second CSI-RS resource set is configured as "off", the value of the first parameter is 8, or the value of the first parameter is R, wherein a value of R is a maximum quantity of receive beams that is reported when the communication device performs capability reporting.

6. The communication method according to claim 1, wherein a configuration of a repetition parameter of the IMR is consistent with a configuration of a repetition parameter of the CMR.

7. The communication method according to claim 1, wherein if the repetition parameter of the first CSI-RS resource set is configured as "off", each CSI-RS resource in the first CSI-RS resource set has a corresponding measurement resource, and the CSI-RS resource and the corresponding measurement resource have a quasi co-location type D (QCL-TypeD) relationship.

8. The communication method according to claim 7, wherein the measurement resource is a synchronization signal block (SSB), and the SSB is a CMR that can be used to measure the L1-SINR, or the SSB is a CMR that can be used to measure an L1-RSRP.

9. The communication method according to claim 7, wherein the measurement resource is a CSI-RS resource in a third CSI-RS resource set, a repetition parameter of the third CSI-RS resource set is configured as "on", and the CSI-RS resource in the third CSI-RS resource set is a CMR that can be used to measure the L1-SINR, or the CSI-RS resource in the third CSI-RS resource set is a CMR that can be used to measure an L1-RSRP.

10. A communication method, comprising:
configuring, by a network device, a channel measurement resource (CMR) and an interference measurement resource (IMR) corresponding to the CMR, wherein the CMR and the IMR are used to measure a layer 1 signal to interference plus noise ratio (L1-SINR), the CMR comprises one or more channel state information reference signal (CSI-RS) resources in a first CSI-RS resource set, and the IMR comprises one or more CSI-RS resources in a second CSI-RS resource set; and
sending, by the network device, the CMR and the IMR corresponding to the CMR to a terminal;
wherein a repetition parameter corresponding to the first CSI-RS resource set is used for determining a value of a first parameter, and the first parameter is used for determining a measurement periodicity for measuring the L1-SINR;
if the repetition parameter of the first CSI-RS resource set is configured as "on", the value of the first parameter is ⌈R/K⌉, or the value of the first parameter is ⌈R/min(K, L)⌉, wherein
a value of R is a maximum quantity of receive beams that is reported when the communication device performs capability reporting, min(K, L) indicates that a smaller value in K and L is used, a value of K is a quantity of CSI-RS resources in the first CSI-RS resource set, and a value of L is a quantity of CSI-RS resources in the second CSI-RS resource set.

11. The communication method according to claim 10, wherein a configuration of a repetition parameter of the IMR is consistent with a configuration of a repetition parameter of the CMR; and
if a repetition parameter of the first CSI-RS resource set is configured as "off", the network device configures a corresponding measurement resource for each CSI-RS resource in the first CSI-RS resource set, wherein the CSI-RS resource and the corresponding measurement resource have a quasi co-location type D (QCL-TypeD) relationship.

12. The communication method according to claim 11, wherein the measurement resource is a synchronization signal block (SSB), and the SSB is a CMR that can be used to measure the L1-SINR, or the SSB is a CMR that can be used to measure an L1-RSRP.

13. The communication method according to claim 11, wherein the measurement resource is a CSI-RS resource in a third CSI-RS resource set, a repetition parameter of the third CSI-RS resource set is configured as "on", and the CSI-RS resource in the third CSI-RS resource set is a CMR that can be used to measure the L1-SINR, or the CSI-RS resource in the third CSI-RS resource set is a CMR that can be used to measure an L1-RSRP.

14. An apparatus, comprising:
a processor; and
a non-transitory computer readable memory coupled to the processor and storing program instructions that, when executed by the processor, cause the apparatus to perform the following steps:
receiving a channel measurement resource (CMR) and an interference measurement resource (IMR) corresponding to the CMR, wherein the CMR and the IMR are used to measure a layer 1 signal to interference plus noise ratio (L1-SINR), the CMR comprises one or more channel state information reference signal (CSI-RS) resources in a first CSI-RS resource set, and the IMR comprises one or more CSI-RS resources in a second CSI-RS resource set;
determining a value of a first parameter based on a repetition parameter corresponding to the first CSI-RS resource set; and
determining, based on the value of the first parameter, a measurement periodicity for measuring the L1-SINR;
wherein if the repetition parameter of the first CSI-RS resource set is configured as "on", the value of the first parameter is ⌈R/K⌉, or the value of the first parameter is ⌈R/min(K, L)⌉, wherein
a value of R is a maximum quantity of receive beams that is reported when the communication device performs capability reporting, min(K, L) indicates that a smaller value in K and L is used, a value of K is a quantity of CSI-RS resources in the first CSI-RS resource set, and a value of L is a quantity of CSI-RS resources in the second CSI-RS resource set.

15. The apparatus according to claim 14, wherein if the repetition parameter of the first CSI-RS resource set is configured as "off", the value of the first parameter is 1.

16. The apparatus according to claim 14, wherein the program instructions that, when executed by the processor, cause the apparatus to perform the following step: determining, by the communication device, the value of the first parameter based on the repetition parameter corresponding to the first CSI-RS resource set and a repetition parameter corresponding to the second CSI-RS resource set.

17. The apparatus according to claim 16, wherein if the repetition parameter of the first CSI-RS resource set and the repetition parameter of the second CSI-RS resource set are both configured as "on", the value of the first parameter is ⌈R/K⌉, or the value of the first parameter is ⌈R/min(K, L)⌉, wherein
a value of R is a maximum quantity of receive beams that is reported when the communication device performs capability reporting, min(K, L) indicates that a smaller value in K and L is used, a value of K is a quantity of CSI-RS resources in the first CSI-RS resource set, and a value of L is a quantity of CSI-RS resources in the second CSI-RS resource set.

18. The apparatus according to claim 16, wherein if the repetition parameter of the first CSI-RS resource set is configured as "off", or the repetition parameter of the second CSI-RS resource set is configured as "off", the value of the first parameter is 8, or the value of the first parameter is R, wherein a value of R is a maximum quantity of receive beams that is reported when the communication device performs capability reporting.

19. An apparatus, comprising:
a processor; and
a non-transitory computer readable memory coupled to the processor and storing program instructions that, when executed by the processor, cause the apparatus to perform the following steps:
configuring a channel measurement resource (CMR) and an interference measurement resource (IMR) corresponding to the CMR, wherein the CMR and the IMR are used to measure a layer 1 signal to interference plus noise ratio (L1-SINR), the CMR comprises one or more channel state information reference signal (CSI-RS) resources in a first CSI-RS resource set, and the IMR comprises one or more CSI-RS resources in a second CSI-RS resource set; and
sending the CMR and the IMR corresponding to the CMR to a terminal;
wherein a repetition parameter corresponding to the first CSI-RS resource set is used for determining a value of a first parameter, and the first parameter is used for determining a measurement periodicity for measuring the L1-SINR;
if the repetition parameter of the first CSI-RS resource set is configured as "on", the value of the first parameter is [R/K], or the value of the first parameter is [R/min (K, L)], wherein a value of R is a maximum quantity of receive beams that is reported when the communication device performs capability reporting, min (K, L) indicates that a smaller value in K and L is used, a value of K is a quantity of CSI-RS resources in the first CSI-RS resource set, and a value of L is a quantity of CSI-RS resources in the second CSI-RS resource set.

20. The apparatus according to claim 19, wherein a configuration of a repetition parameter of the IMR is consistent with a configuration of a repetition parameter of the CMR; and
if a repetition parameter of the first CSI-RS resource set is configured as "off", the network device configures a corresponding measurement resource for each CSI-RS resource in the first CSI-RS resource set, wherein the CSI-RS resource and the corresponding measurement resource have a quasi co-location type D (QCL-TypeD) relationship.

21. The apparatus according to claim 19, wherein the measurement resource is a synchronization signal block (SSB), and the SSB is a CMR that can be used to measure the L1-SINR, or the SSB is a CMR that can be used to measure an L1-RSRP.

22. The apparatus according to claim 19, wherein the measurement resource is a CSI-RS resource in a third CSI-RS resource set, a repetition parameter of the third CSI-RS resource set is configured as "on", and the CSI-RS resource in the third CSI-RS resource set is a CMR that can be used to measure the L1-SINR, or the CSI-RS resource in the third CSI-RS resource set is a CMR that can be used to measure an L1-RSRP.

* * * * *